(12) United States Patent
Nagase et al.

(10) Patent No.: US 8,955,883 B2
(45) Date of Patent: Feb. 17, 2015

(54) STEERING APPARATUS

(75) Inventors: Masatoshi Nagase, Gunma-ken (JP); Masayoshi Mashimo, Gunma-ken (JP); Nobuhiro Ishii, Gunma-ken (JP); Kenji Takeuchi, Gunma-ken (JP); Tomohiro Ikuta, Gunma-ken (JP); Hiroshi Fukuda, Gunma-ken (JP); Tadashi Hibino, Gunma-ken (JP)

(73) Assignee: NSK Ltd., Tokyo (JP)

( * ) Notice: Subject to any disclaimer, the term of this patent is extended or adjusted under 35 U.S.C. 154(b) by 96 days.

(21) Appl. No.: 13/810,691

(22) PCT Filed: Jul. 19, 2012

(86) PCT No.: PCT/JP2012/068332
§ 371 (c)(1),
(2), (4) Date: Jan. 17, 2013

(87) PCT Pub. No.: WO2013/069340
PCT Pub. Date: May 16, 2013

(65) Prior Publication Data
US 2014/0182409 A1    Jul. 3, 2014

(30) Foreign Application Priority Data

Nov. 7, 2011  (JP) ................. 2011-244029
Nov. 15, 2011 (JP) ................. 2011-250000
Apr. 16, 2012 (JP) ................. 2012-092977

(51) Int. Cl.
*B62D 1/18* (2006.01)

(52) U.S. Cl.
USPC ........................................ 280/775

(58) Field of Classification Search
CPC ........ B62D 1/181; B62D 1/184; B62D 1/185; B62D 1/192; B62D 1/195; B62D 1/16; B62D 25/145
USPC ............................ 280/775, 777; 74/492, 493
See application file for complete search history.

(56) References Cited

U.S. PATENT DOCUMENTS 7,469,615 B2 * 12/2008 Finkbeiner et al. ............. 74/493
8,186,242 B2 *  5/2012 Uesaka .......................... 74/493

(Continued)

FOREIGN PATENT DOCUMENTS

JP    2003-170837 A    6/2003
JP    2011-84133 A     4/2011

(Continued)

OTHER PUBLICATIONS

English translation of International Preliminary Report on Patentability from International Patent Application No. PCT/JP2012/068332, May 22, 2014.

*Primary Examiner* — Faye M. Fleming
(74) *Attorney, Agent, or Firm* — Miles & Stockbridge P.C.

(57) ABSTRACT

When the guide bracket 61 is fixed to the vehicle-mounting bracket 21 by the guide pin 71, the upper surfaces 24c, 24c of the capsules 24, 24 are in contact with the lower surfaces 61c, 61c of the flange portions 61b, 61b on the guide bracket 61, and the first engaging portions 64, 64 and the second engaging portions 65, 65 engage with the capsules 24, 24. As a result, even before fixing the vehicle-mounting bracket 21 and the guide bracket 61 to the vehicle body 41 by the bolt 22, the guide bracket 61 does not rotate with respect to the vehicle-mounting bracket 21 about the guide pin 71, or move in the forward and rearward direction, or in the vehicle body width direction.

15 Claims, 23 Drawing Sheets

(56) References Cited

U.S. PATENT DOCUMENTS

| | | | |
|---|---|---|---|
| 8,528,937 B2* | 9/2013 | Minamigata et al. | 280/777 |
| 8,534,705 B2* | 9/2013 | Fujiwara et al. | 280/777 |
| 8,596,683 B2* | 12/2013 | Ishii | 280/775 |
| 8,622,427 B2* | 1/2014 | Minamigata et al. | 280/777 |
| 8,678,436 B2* | 3/2014 | Duffy | 280/777 |
| 2009/0151498 A1* | 6/2009 | Garbrecht et al. | 74/493 |
| 2012/0240711 A1* | 9/2012 | Minamigata et al. | 74/493 |
| 2012/0247258 A1* | 10/2012 | Maniwa et al. | 74/493 |
| 2012/0291585 A1* | 11/2012 | Minamigata et al. | 74/493 |

FOREIGN PATENT DOCUMENTS

| | | |
|---|---|---|
| JP | 2011-131682 A | 7/2011 |
| JP | 2011-156878 A | 8/2011 |

\* cited by examiner

STEERING APPARATUS

TECHNICAL FIELD

The present invention relates to a steering apparatus, in particular to a steering apparatus in which a steering shaft on which a steering wheel is attached and a steering column holding the steering shaft moves forward with respect to the vehicle body to absorb the impact load upon a secondary collision.

BACKGROUND ART

Japanese Patent Application Laid-Open Nos. 2011-84133 and 2003-170837 disclose a steering apparatus in which a steering shaft on which a steering wheel is attached and a steering column holding the steering shaft moves forward with respect to the vehicle body to absorb the impact load upon a secondary collision. The steering column in the steering apparatus is composed of an upper column and a lower column, which are slidably fitted along a shaft direction. The upper column is held by the vehicle body through a vehicle-mounting bracket. The vehicle-mounting bracket on which the upper column is fixed is fixed to the vehicle body through capsules, and moves forward together with the upper column with detaching from the capsules by given impact of a secondary collision.

There has been a steering apparatus constructed in such a manner that in order to smoothly move the vehicle-mounting bracket forward upon a secondary collision, a guide bracket for guiding a movement of the vehicle-mounting bracket forward is attached to the vehicle body. In the guide bracket, a guide hole is formed parallel to the moving direction of the upper column, and a guide pin fixed to the vehicle-mounting bracket moves forward up to a movement end of the guide hole with being guided by the guide hole. In this manner, with the guide pin being guided by the guide hole, the vehicle-mounting bracket moves forward smoothly.

In the steering apparatus having such a construction that the guide pin in the vehicle-mounting bracket is guided by the guide hole in the guide bracket, when the steering apparatus is in a state before attaching to the vehicle body such as a state during transportation, the guide bracket is held to the vehicle-mounting bracket by only the guide pin. Accordingly, a mounting position of the guide bracket with respect to the vehicle-mounting bracket is shifted by vibrations and the like during transportation even if it has been adjusted to the position capable of being attached to the vehicle body at the beginning. In other words, the guide bracket rotates with respect to the vehicle-mounting bracket centering around the guide pin. As a result, upon attaching the steering apparatus to the vehicle body, the position of the guide bracket has to be adjusted again, so that it takes time to carry out the assembling work.

In the steering apparatus disclosed in Japanese Patent Application Laid-Open No. 2011-84133, a rearward side of a guide member that guides the vehicle-mounting bracket up to a frontward movement end with respect to the vehicle body is attached to capsules, so that it becomes possible to prevent the guide member from falling off from the capsules or shifting the position with respect to the capsules. However, in the steering apparatus disclosed in Japanese Patent Application Laid-Open Nos. 2011-84133, the capsules are held by the guide member in front and rear direction and upper and lower direction with respect to the vehicle body, there is a real possibility that the guide member rotates with respect to the capsules to cause shifting the attaching position of the guide member with respect to the capsules.

Moreover, in the steering apparatus disclosed in Japanese Patent Application Laid-Open No. 2003-170837, a plurality of projections are formed on the capsule so as not to fall off the capsule from the vehicle-mounting bracket upon attaching the steering apparatus to the vehicle body. However, in the steering apparatus disclosed in Japanese Patent Application Laid-Open No. 2003-170837, upon attaching the steering apparatus to the vehicle body, each of the capsules is prevented from falling off from the vehicle-mounting bracket. Accordingly, there is no function to prevent the attaching position of the guide bracket with respect to the vehicle-mounting bracket from shifting.

Moreover, the steering apparatus disclosed in Japanese Patent Application Laid-Open Nos. 2011-84133 and 2003-170837 is not adopted to a steering apparatus that a guide pin fixed to a vehicle-mounting bracket moves forward up to a movement end with being guided by a guide hole of a guide bracket.

PRIOR ART DOCUMENTS

Patent Documents

Patent Document 1: Japanese Patent Application Laid-Open No. 2011-84133
Patent Document 2: Japanese Patent Application Laid-Open No. 2003-170837

SUMMARY OF THE INVENTION

Problems to be Solved by the Invention

The present invention makes it possible to provide a steering apparatus capable of preventing a guide bracket from rotating with respect to a vehicle-mounting bracket centering on the guide pin in a state before attaching the vehicle-mounting bracket and the guide bracket to a vehicle body.

Means for Solving the Problems

The above-described object is achieved by the following ways. In a steering apparatus comprising: a steering shaft capable of attaching a steering wheel at rearward end thereof with respect to a vehicle body; a steering column that rotatably holds the steering shaft inside thereof and moves frontward with respect to the vehicle body upon a secondary collision; a vehicle-mounting bracket that holds the steering column and moves frontward with respect to the vehicle body together with the steering column while collapsing upon the secondary collision; a couple of capsules that are disposed in a width direction with respect to the vehicle body, fixed to the vehicle body, and on which the vehicle-mounting bracket is attached so as to hold the vehicle-mounting bracket to the vehicle body, and make the vehicle-mounting bracket detach from the vehicle body while absorbing predetermined impact energy upon the secondary collision; a fixed bracket that is attached to the vehicle-mounting bracket to be fixed to the vehicle body and remained to the vehicle body upon the secondary collision; and a guide mechanism that guides the movement of the vehicle-mounting bracket upon the secondary collision; the improvement comprises: a movement-preventing mechanism that is provided for preventing movement of the fixed bracket attached to the vehicle-mounting bracket, with respect to the vehicle-mounting bracket before fixing the fixed bracket to the vehicle body.

In a preferred aspect of the present invention, it is preferable that the movement-preventing mechanism includes at least one of the couple of capsules, and an engaging portion that is formed on the fixed bracket and engaged with said at least one of the couple of capsules.

In the preferred aspect of the present invention, it is preferable that the guide mechanism is composed of a guide pin fixed to the vehicle-mounting bracket, and a guide hole that is formed on the fixed bracket and engaged with the guide pin slidably in the moving direction of the vehicle-mounting bracket, the fixed bracket is attached to the vehicle-mounting bracket by engaging the guide pin slidably to the guide hole, and said engaging portion, engaging with said at least one of the capsules, prevents the fixed bracket from moving in the frontward and rearward direction and in the width direction with respect to the vehicle body, and rotating around the guide pin.

In the preferred aspect of the present invention, it is preferable that said engaging portion includes: a couple of first engaging portions each of which protrudes downward from in the vicinity of each end in the width direction with respect to the vehicle body of the rearward end surface of the fixed bracket, and engaged with the rear end surface of the corresponding capsule; and a couple of second engaging portions each of which protrudes downward from rearward end of each end surface in the width direction of the fixed bracket, and includes a side-surface-engaging portion engaging with a vehicle-body-width-direction-side surface of the corresponding capsule and a front-end-surface-engaging portion engaging with a front-end-surface of the same capsule.

In the preferred aspect of the present invention, it is preferable that said engaging portion includes: a couple of first engaging portions each of which protrudes downward from in the vicinity of each end in the width direction with respect to the vehicle body of the rearward end surface of the fixed bracket, and engaged with the rear end surface of the corresponding capsule; and a couple of second engaging portions each of which protrudes downward from inside in the width direction of the first engaging portion of the rearward end surface of the fixed bracket, and includes a side-surface-engaging portion engaging with a vehicle-body-width-direction-side surface of the corresponding capsule and a front-end-surface-engaging portion engaging with a front-end-surface of the same capsule.

In the preferred aspect of the present invention, it is preferable that said engaging portion includes: a couple of first engaging portions each of which protrudes downward from in the vicinity of each end in the width direction with respect to the vehicle body of the rearward end surface of the fixed bracket, and engaged with the rear end surface of the corresponding capsule; and a single second engaging portion which protrudes downward from in the vicinity of one of the couple of first engaging portions of the rearward end surface of the fixed bracket, and includes a side-surface-connecting portion engaging with a vehicle-body-width-direction-side surface of the corresponding capsule and a front-end-surface-engaging portion engaging with a front-end-surface of the same capsule.

In the preferred aspect of the present invention, it is preferable that a protruding portion formed on at least one capsule with protruding upward of the upper surface of the capsule, and the engaging portion is a hole engaging with the protruding portion protruding upward.

In the preferred aspect of the present invention, it is preferable that said engaging portion is a protruding portion formed on at least one lower surface among lower surfaces in the vicinity of both side ends in the width direction with respect to the vehicle body of the fixed bracket protruding downward lower than the lower surface, and a hole for engaging with the protruding portion protruding downward is formed on the capsule.

In the preferred aspect of the present invention, it is preferable that The steering apparatus according to claim 8, wherein said protruding portion protruding downward is formed a cylindrical shape, an inner circumference of the cylindrical shape forms a bolt hole in which a bolt for attaching the fixed bracket to the vehicle body is inserted, and the hole on the capsule is a bolt hole in which a bolt for attaching the capsule to the vehicle body is inserted.

In the preferred aspect of the present invention, it is preferable that said fixed bracket is formed from a single plate, the couple of second engaging portions comprising downward extending portions extending downward from rearward ends of end surfaces at both sides of the single plate in the width direction with respect to the vehicle body, the side-surface-engaging portions extending forward along vehicle-body-width-direction-side surfaces of the corresponding capsule from the lower ends of the downward extending portions, and front-end-surface-engaging portions bending at a right angle from frontward ends of the side-surface-engaging portions and extending inside in the vehicle-body-width direction.

In the preferred aspect of the present invention, it is preferable that a chamfered portion is formed between a rear end surface and a lower surface of each capsule.

Effect of the Invention

According to the present invention, even before fixing a vehicle-mounting bracket and a guide bracket to a vehicle body, the guide bracket does not rotate with respect to the vehicle-mounting bracket centering on the guide pin, the fitting position of the guide bracket with respect to the vehicle-mounting bracket does not become imprecise. Accordingly, the work for fixing the vehicle-mounting bracket and the guide bracket to the vehicle body can be performed smoothly.

BRIEF DESCRIPTION OF THE DRAWINGS

FIGS. 21A and 21B are vertical sectional views showing the capsule and the guide bracket according to the fifth embodiment, in which FIG. 21A shows an assembled state, and FIG. 21B shows an exploded state.

MODES FOR CARRYING OUT THE INVENTION

A first embodiment through a seventh embodiment of the present invention are explained below with reference to accompanying drawings. At first, directions with respect to an electric power steering apparatus shown in the present specification are defined. In the present specification, directions with respect to the steering apparatus are the same as the directions of front and rear, right and left, and upper and lower directions of the vehicle body in a state attaching to the vehicle body unless otherwise stated. Right and left direction is also called a vehicle width direction. Moreover, definition of the direction in each of the following drawings is defined in a state where reference symbols shown in each drawing can be read in an ordinary manner.

Figure 1:
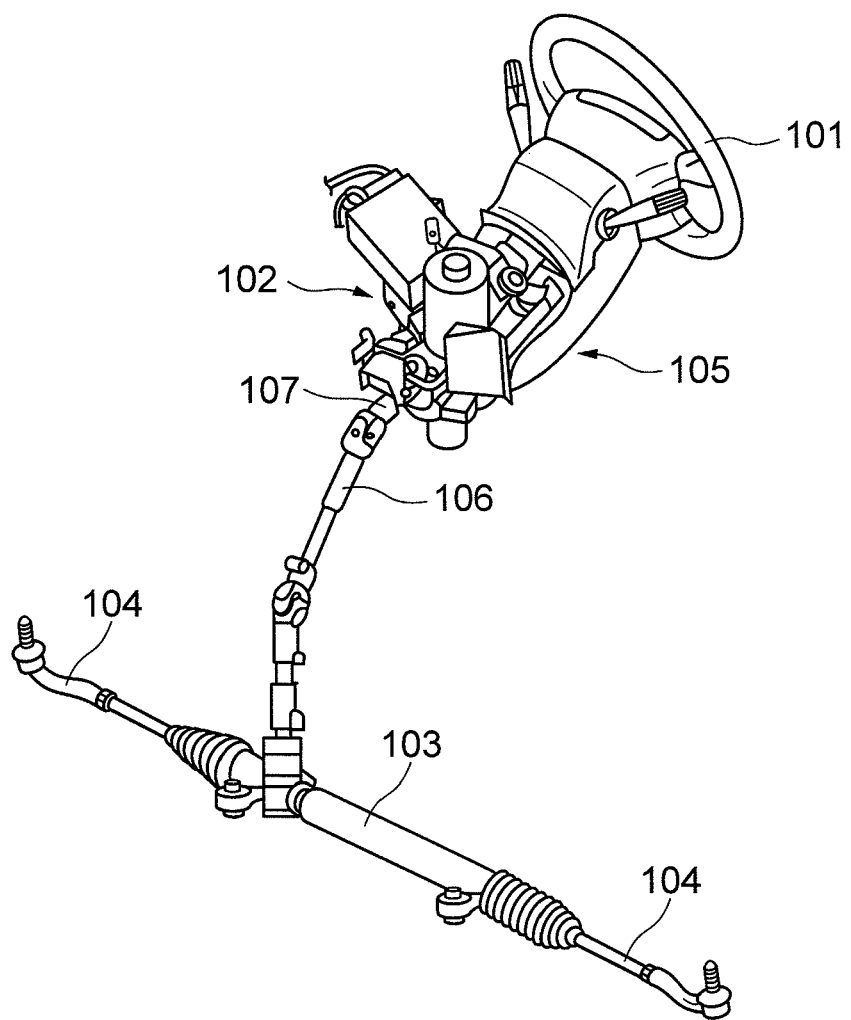
FIG. 1 is an overall perspective view of a steering apparatus according to the present invention.
Figure 2:
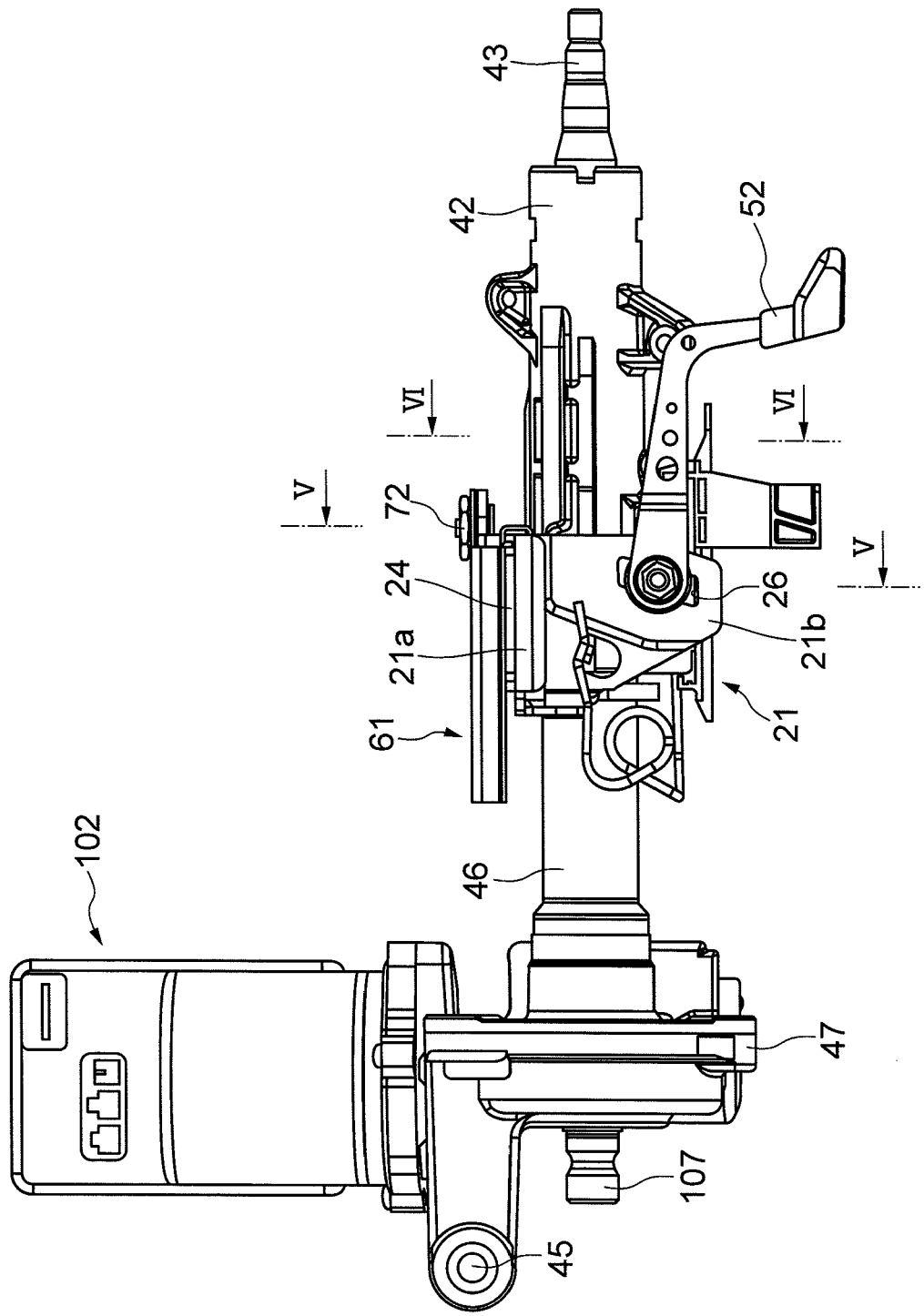
FIG. 2 is a side view of the relevant portions of the steering apparatus according to a first embodiment of the present invention, seen from a side.
Figure 3:
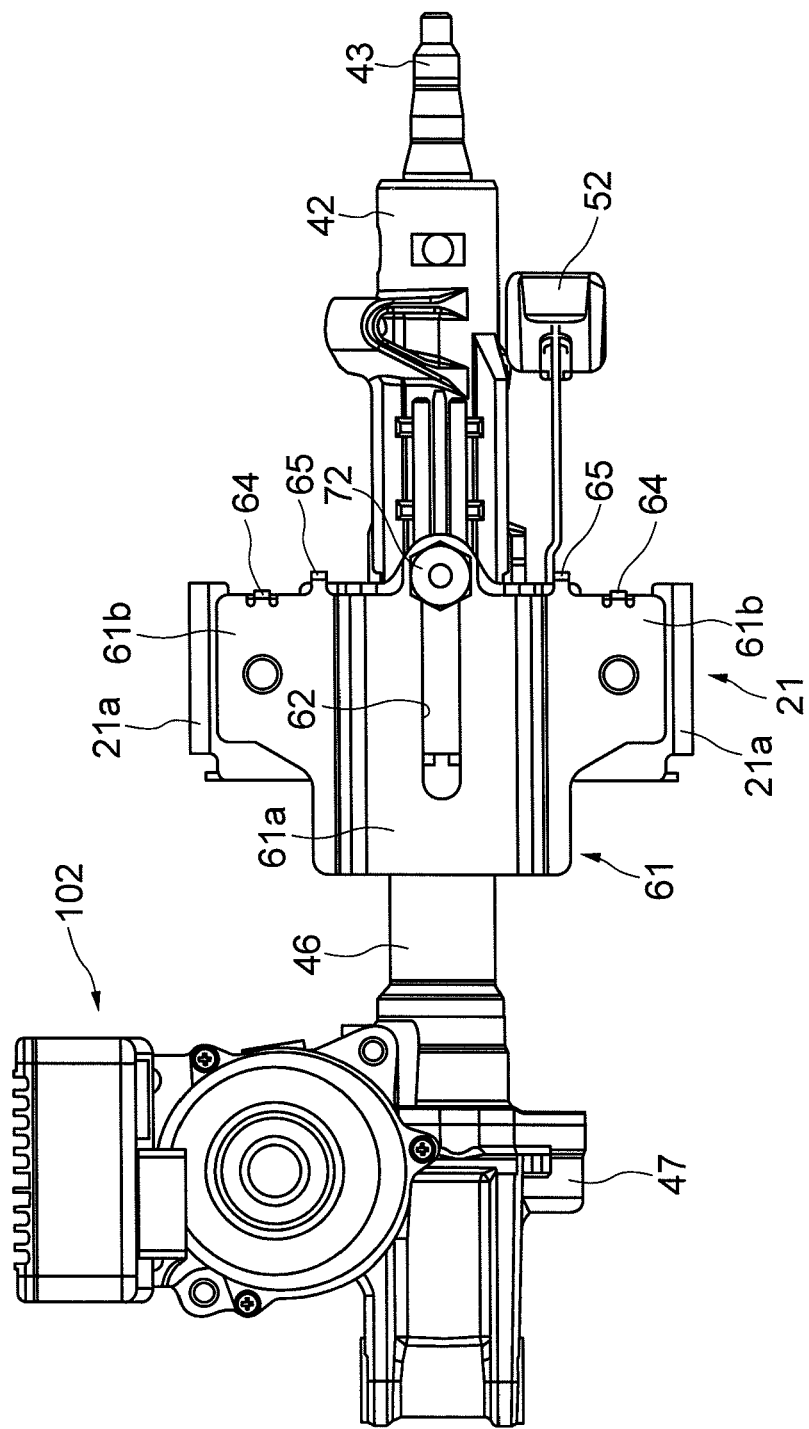
FIG. 3 is a plan view of FIG. 2.
Figure 4:
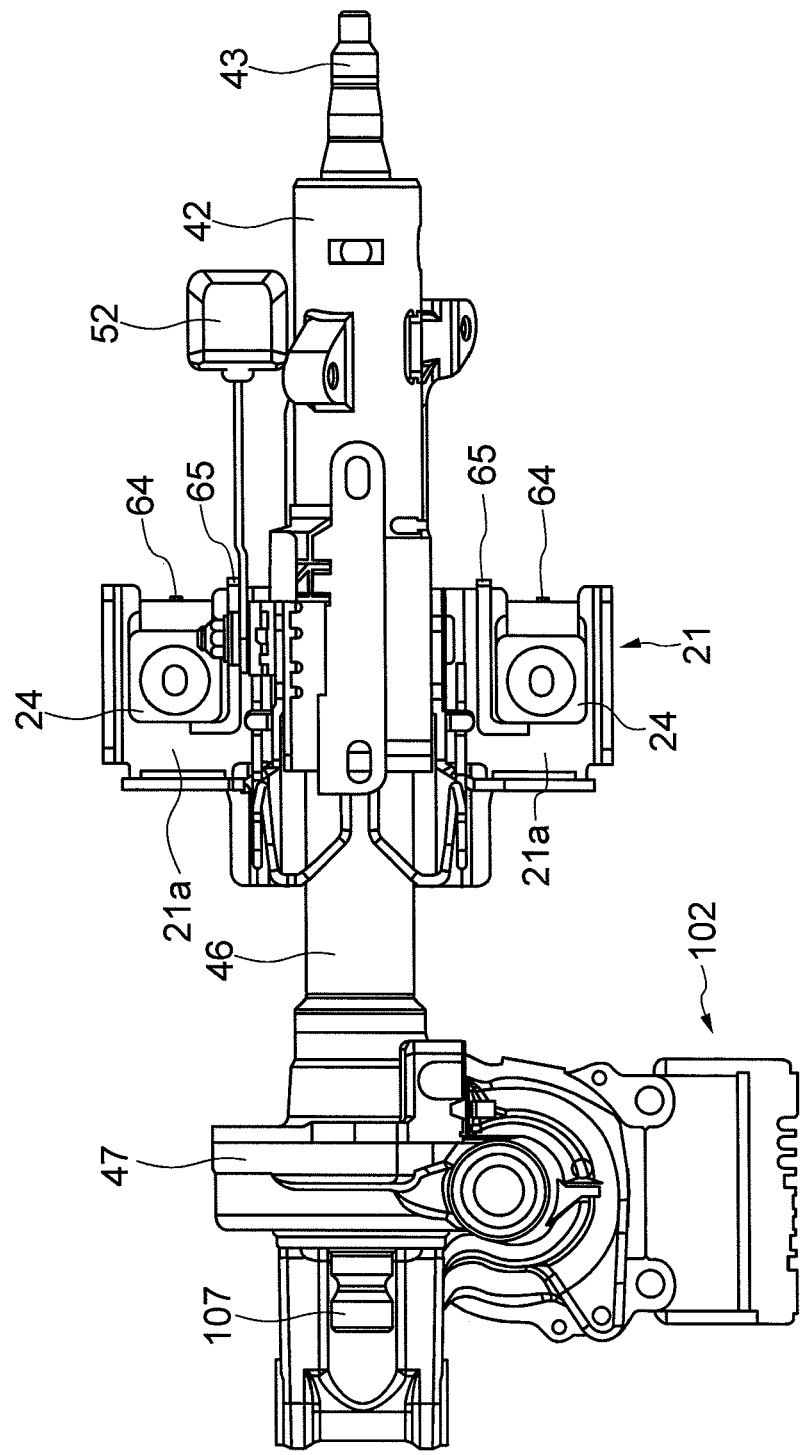
FIG. 4 is a bottom view of FIG. 2.
Figure 5:
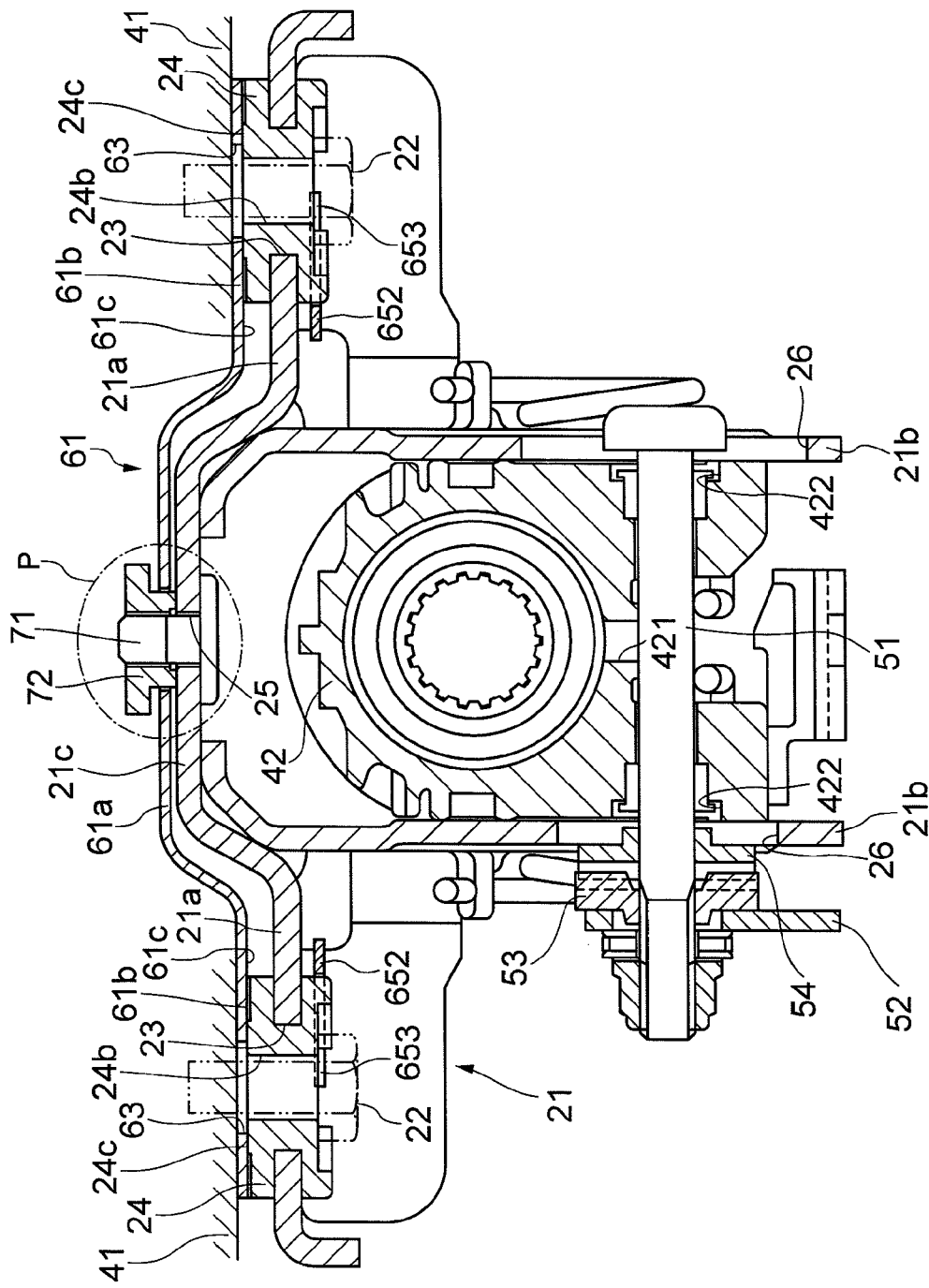
FIG. 5 is an enlarged cross sectional view taken along line V-V in FIG. 2.
Figure 6:
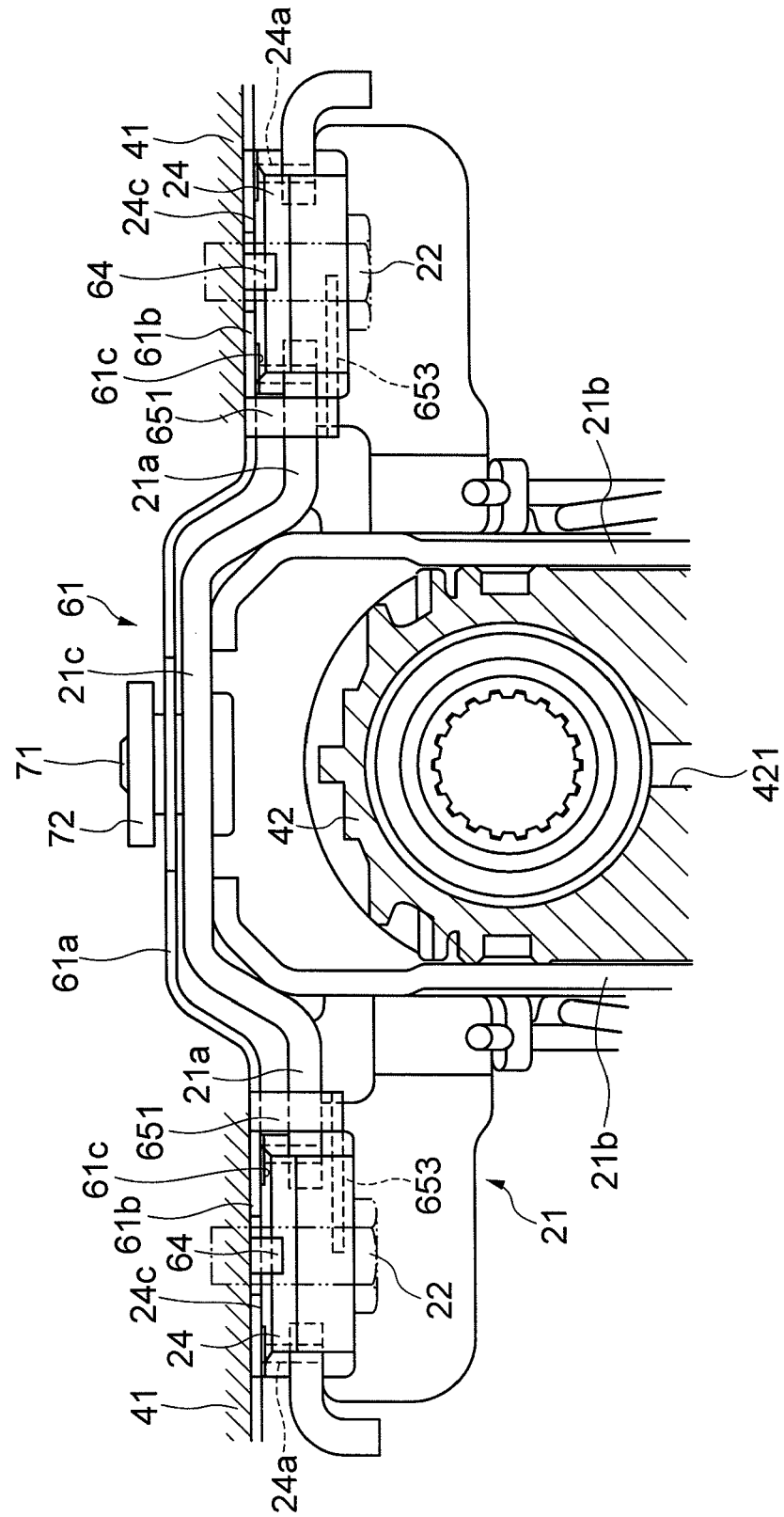
FIG. 6 is an enlarged cross sectional view taken along line VI-VI in FIG. 2, in which a portion of the lower side is omitted.
Figure 7:
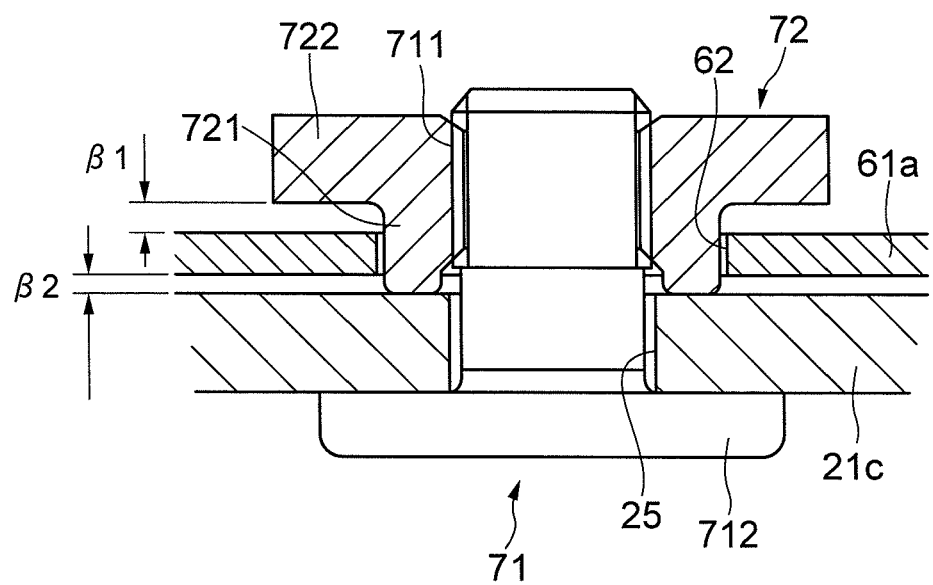
FIG. 7 is an enlarged cross sectional view of the P portion in FIG. 5.
Figure 12B:
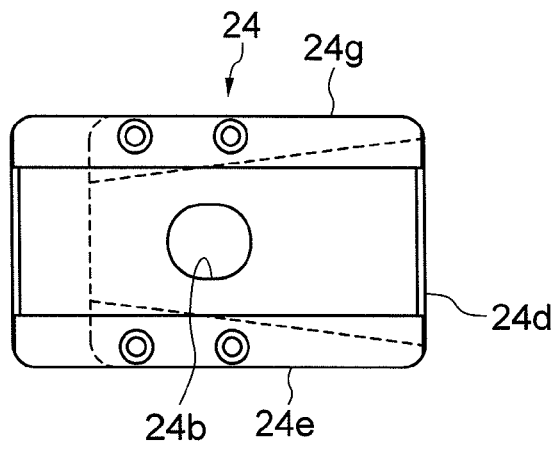
FIG. 12B is a plan view of FIG. 12A.
Figure 12D:
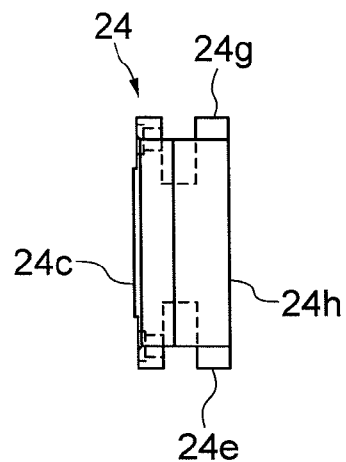
FIG. 12D is a right side view of FIG. 12B.
Figure 12A:
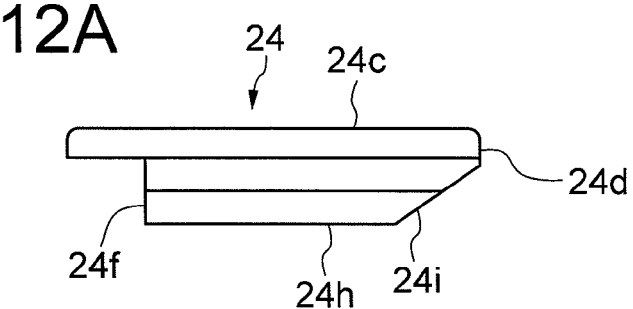
FIG. 12A is a front view showing a single body of a capsule according to the first embodiment of the present invention.
Figure 13A:
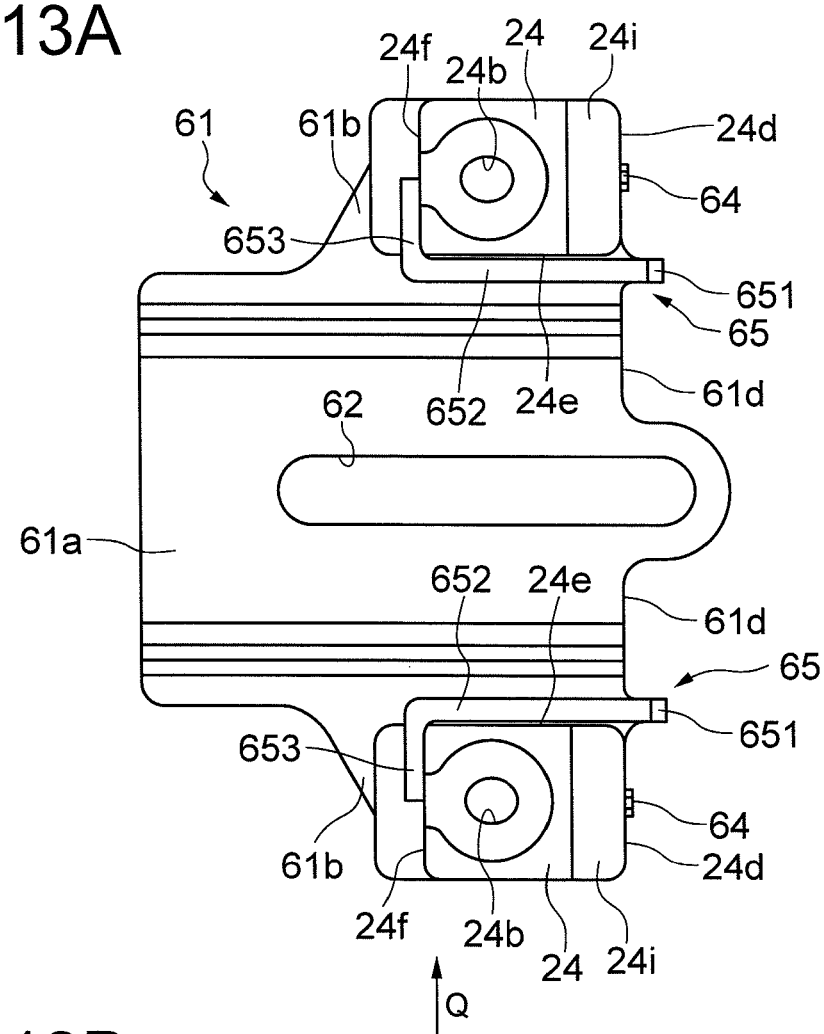
FIG. 13A is a bottom view showing an engaging state of the guide bracket and the capsules according to the first embodiment of the present invention.
Figure 14A:
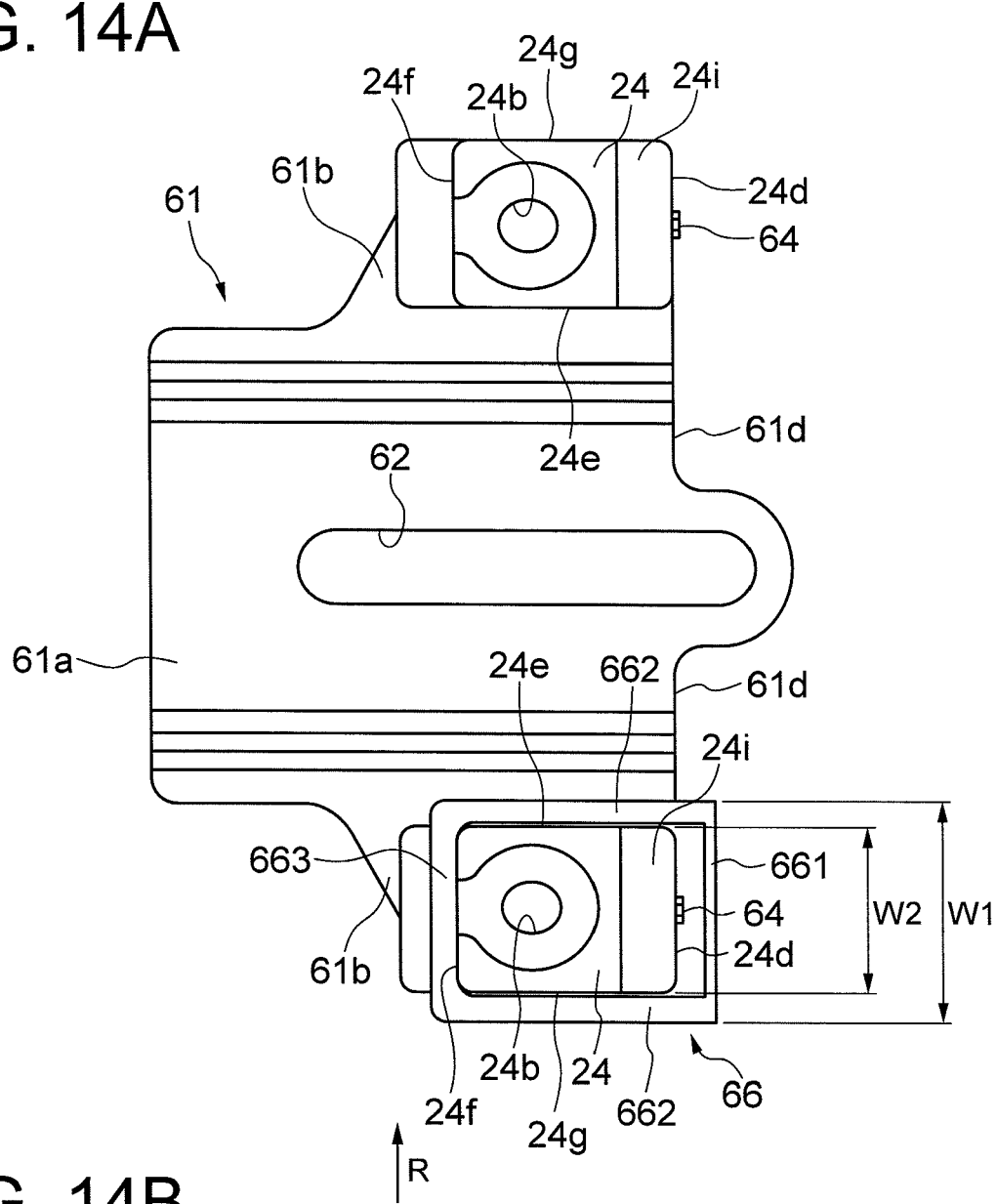
FIG. 14A is a bottom view showing an engaging state of the guide bracket and the capsules according to the second embodiment of the present invention.

In FIG. 1, diagonally downward left of the drawing is the frontward, diagonally upward right of the drawing is the rearward, diagonally upward left of the drawing is the right side, and diagonally downward right of the drawing is the left side. In FIGS. 2 and 12A, the left side of the drawing is the frontward, the right side of the drawing is the rearward, the other side of the drawing is the right side, and the this side of the drawing is the left side. In FIG. 3, the left side of the drawing is the frontward, the right side of the drawing is the rearward, the upward of the drawing is the right side, and the downward of the drawing is the left side. In FIGS. 4, 13A, and 14A, the left side of the drawing is the frontward, the right side of the drawing is the rearward, the downward of the drawing is the right side, and the upward of the drawing is the left side. In FIGS. 5 through 7, the other side of the drawing is the frontward, this side of the drawing is the rearward, the right side of the drawing is the right side, and the left side of the drawing is the left side.

Figure 17:
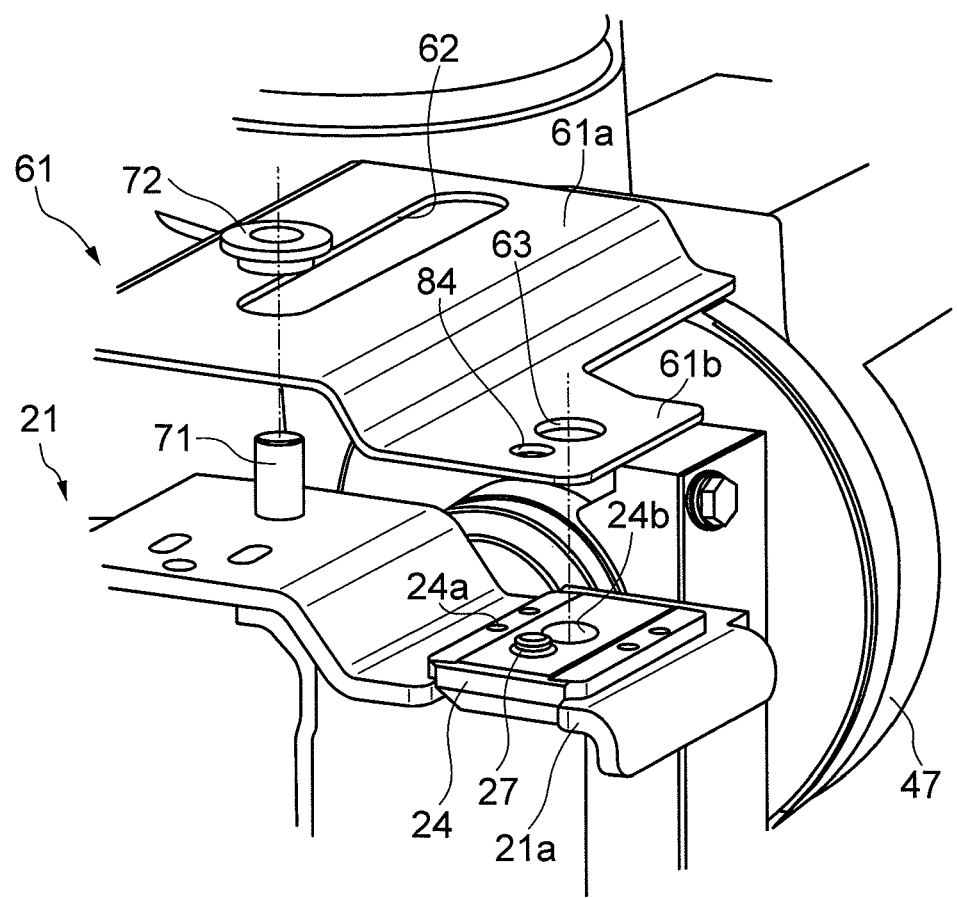
FIG. 17 is an enlarged, exploded perspective view shown in the vicinity of the vehicle-mounting bracket and the guide bracket of a steering apparatus according to a fourth embodiment.
Figure 18:
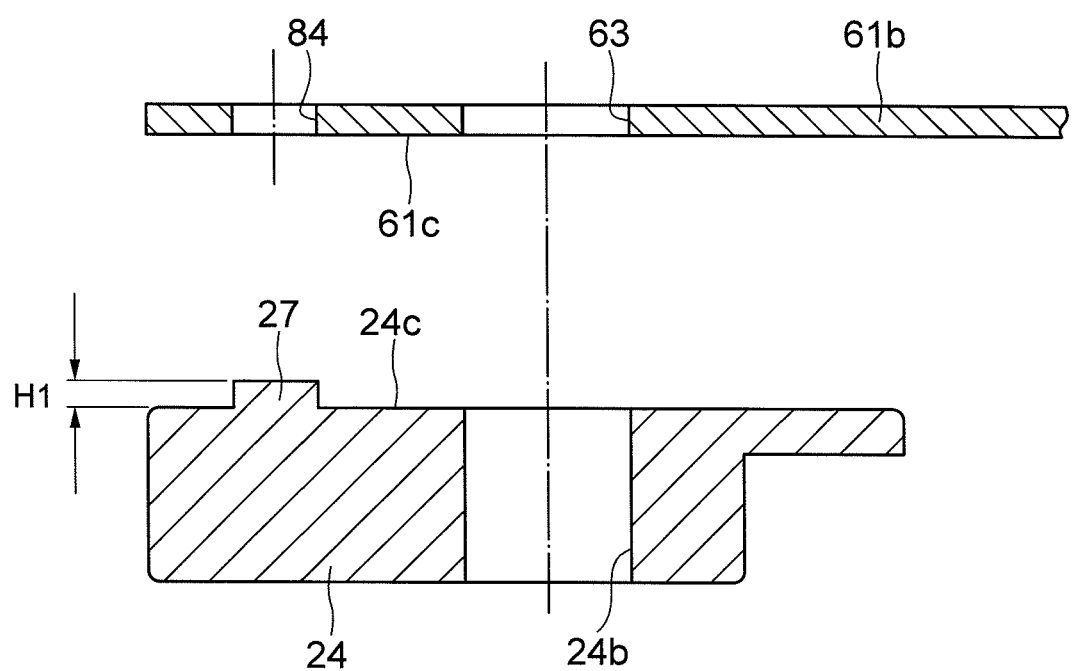
FIG. 18 is an exploded perspective view exploding the capsule and the guide bracket according to the fourth embodiment.
Figure 19:
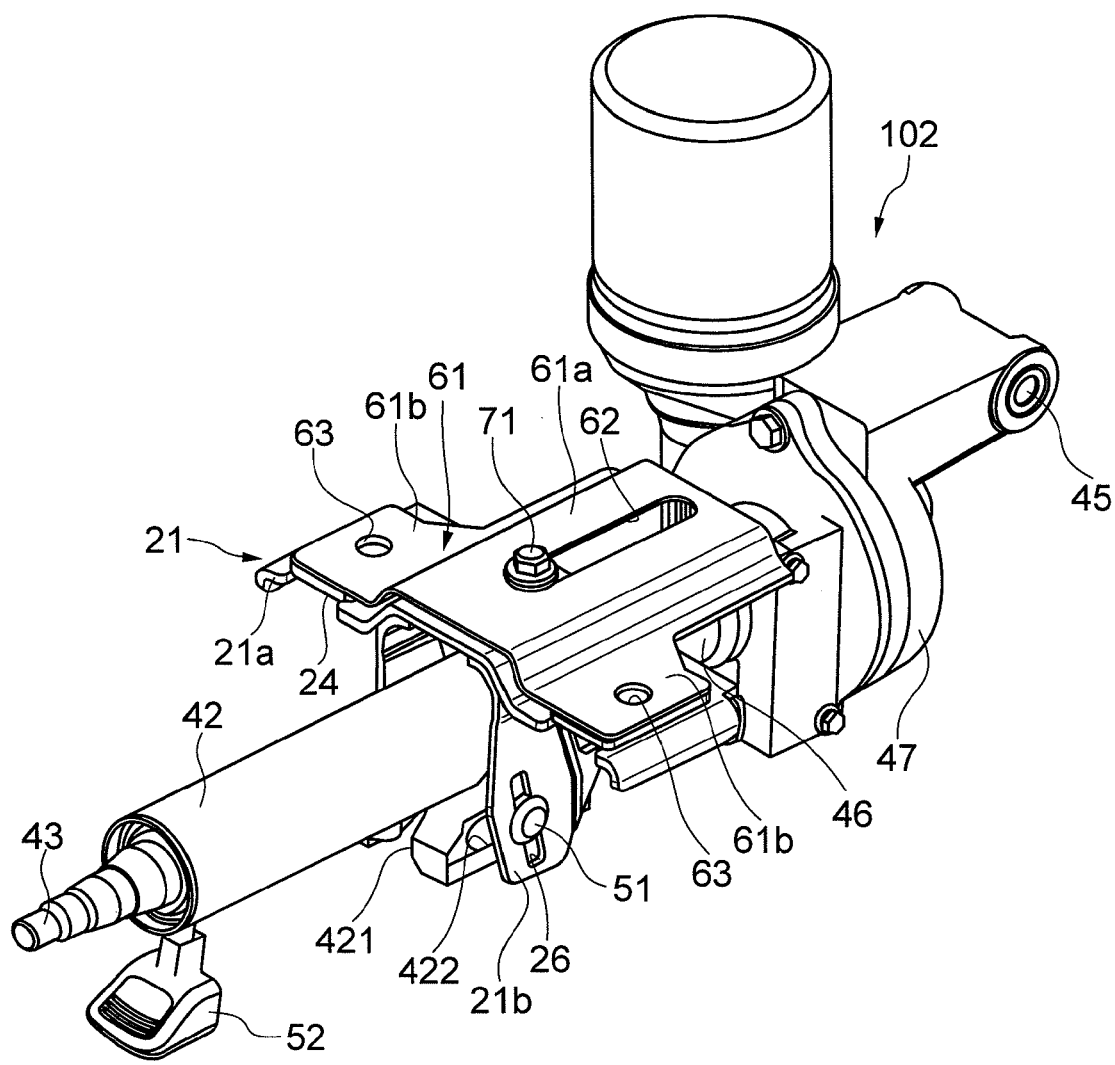
FIG. 19 is a perspective view showing relevant portions of a steering apparatus according to a fifth embodiment seen from right upper side of the rear side of the vehicle body.
Figure 20:
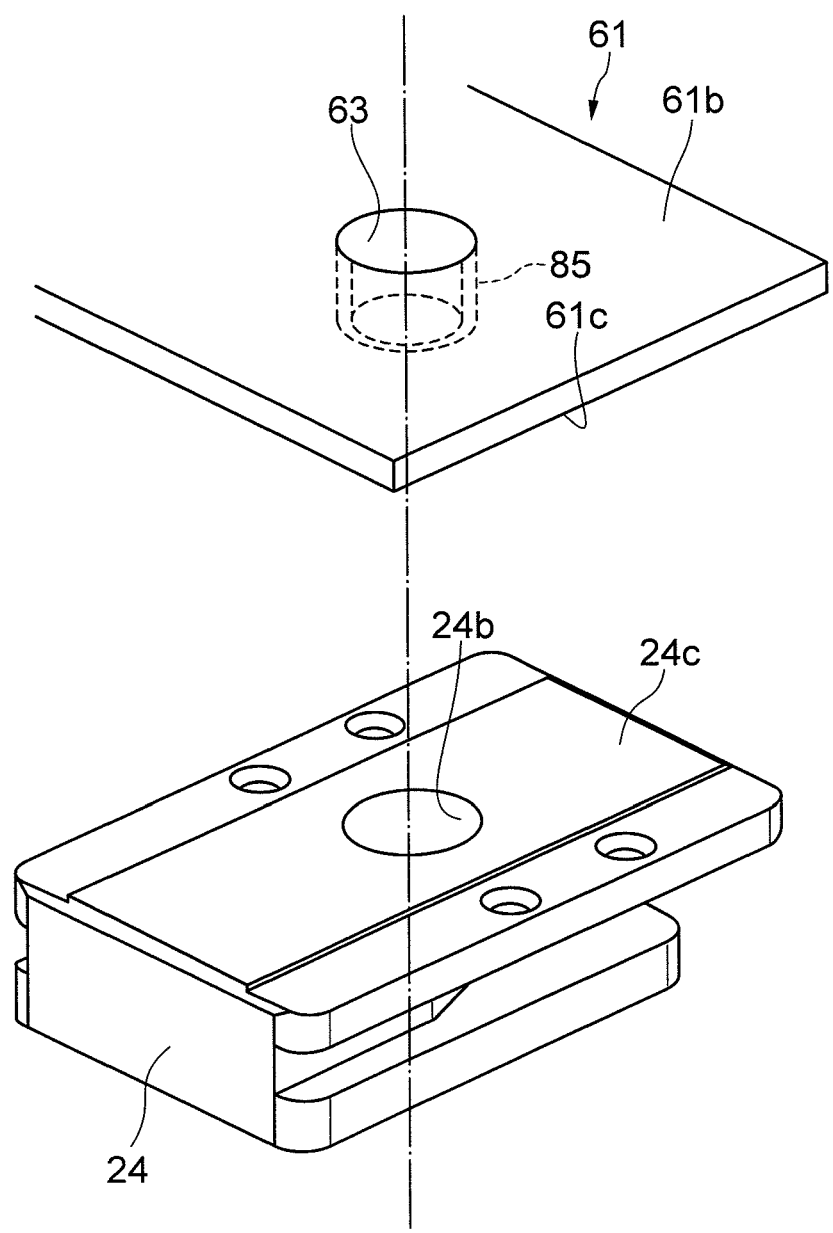
FIG. 20 is an exploded perspective view exploding the capsule and the guide bracket according to the fifth embodiment.
Figure 21A:
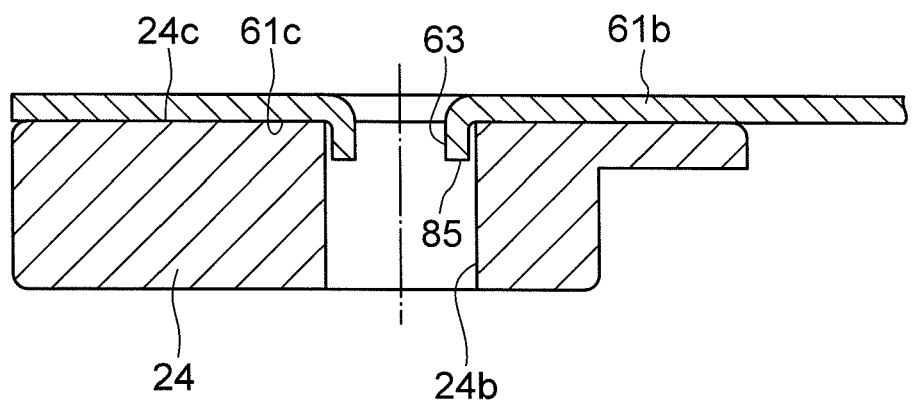
Figure 21B:
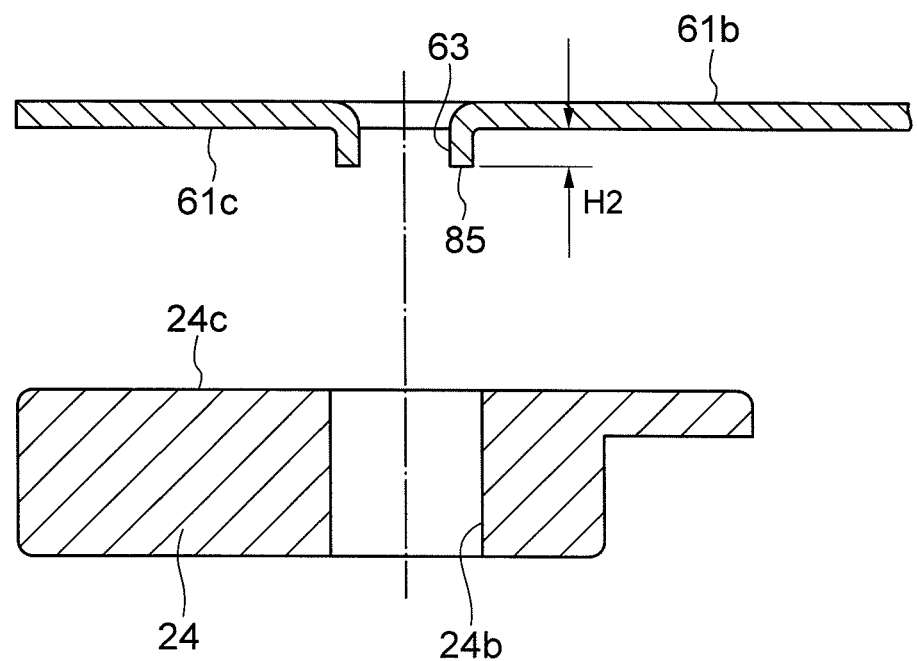

Furthermore, in FIGS. 8 through 11, 15, 17, 19, 20, 22, and 23, diagonally upward right of the drawing is the frontward, diagonally downward left of the drawing is the rearward, diagonally downward right of the drawing is the right side, and diagonally upward left of the drawing is the left side. In FIGS. 18, 21A, and 21B, the right side of the drawing is the frontward, the left side of the drawing is the rearward, this side of the drawing is the right side, and the other side of the drawing is the left side.

(First Embodiment)

FIG. 1 is an overall perspective view showing a steering apparatus according to the present invention. As shown in FIG. 1, a steering apparatus according to a first embodiment of the present invention is a column-assist type power steering apparatus. In order to lighten the hand effort in operating a steering wheel 101, the column-assist, rack-pinion type power steering apparatus shown in FIG. 1 is adapted to apply a steering assisting force generated by the electric power assist mechanism 102 attached to a steering column assembly 105 onto an output shaft 107 to move the rack of a rack-pinion type steering gear assembly 103 in two opposite directions through an intermediate shaft 106, thereby turning the steer wheels via tie rods 104.

Figure 8:
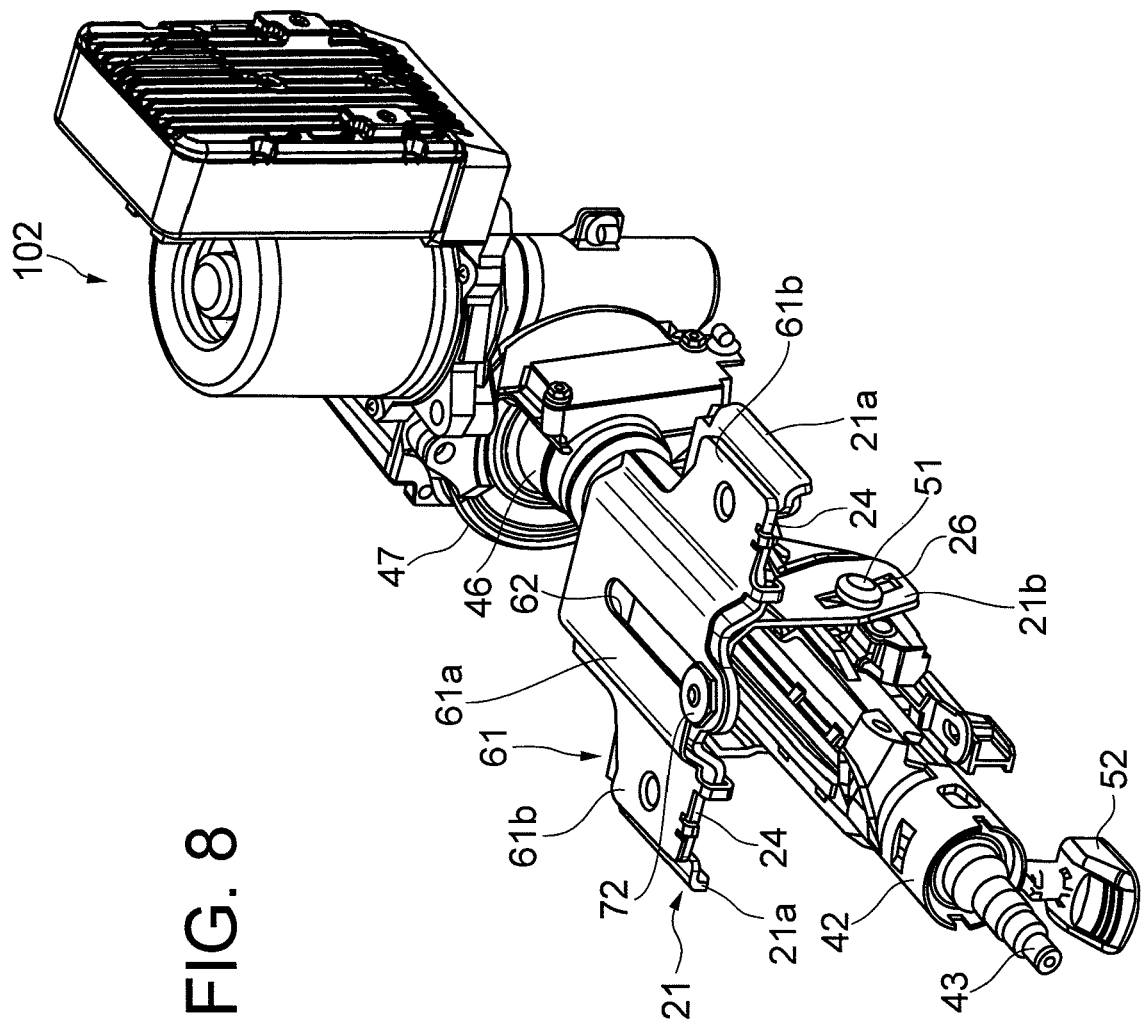
FIG. 8 is an overall perspective view of the steering apparatus according to the first embodiment of the present invention, seen from right upper side of the rear side.
Figure 9:
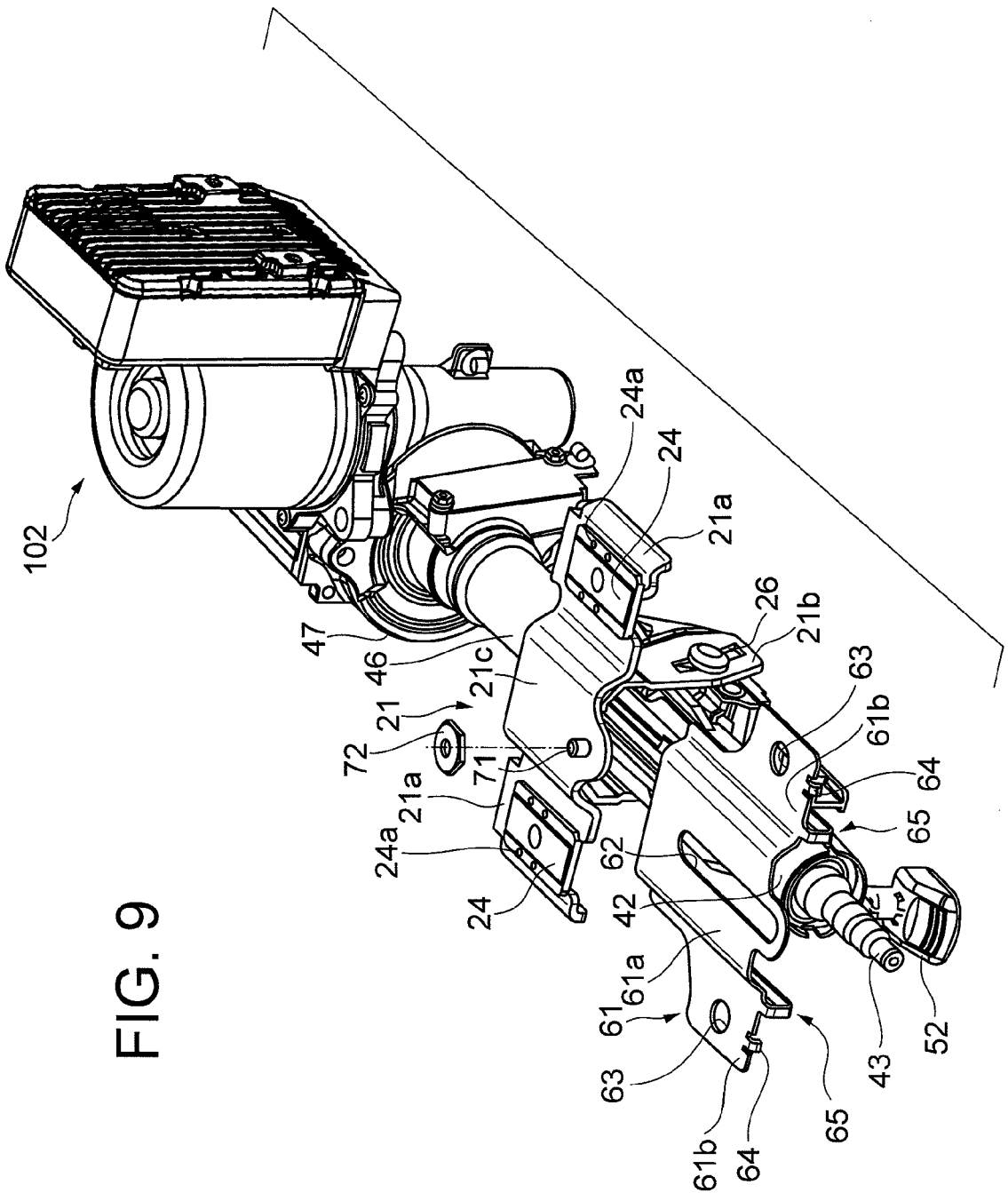
FIG. 9 is an exploded perspective view, in which the vehicle-mounting bracket and the guide bracket shown in FIG. 8 are exploded.

FIG. 2 is a side view of the relevant portions of the steering apparatus according to a first embodiment of the present invention, seen from a side. FIG. 3 is a plan view of FIG. 2. FIG. 4 is a bottom view of FIG. 2. FIG. 5 is an enlarged cross sectional view taken along line V-V in FIG. 2. FIG. 6 is an enlarged cross sectional view taken along line VI-VI in FIG. 2, in which a portion of the lower side is omitted. FIG. 7 is an enlarged cross sectional view of the P portion in FIG. 5. FIG. 8 is an overall perspective view of the steering apparatus according to the first embodiment of the present invention, seen from right upper side of the rear side. FIG. 9 is an exploded perspective view, in which the vehicle-mounting bracket and the guide bracket shown in FIG. 8 are exploded.

Figure 10:
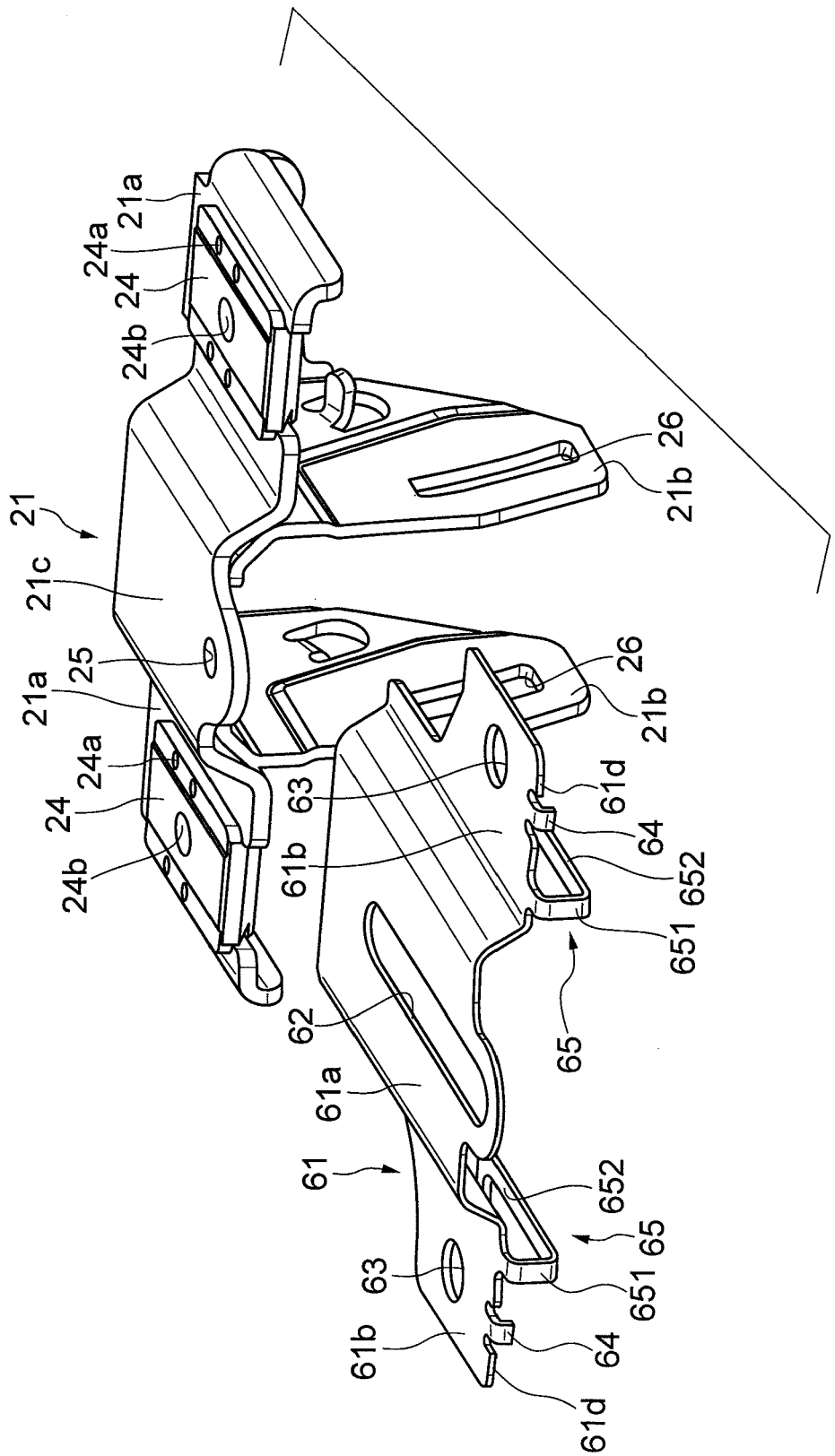
FIG. 10 is an enlarged, exploded perspective view shown in the vicinity of the vehicle-mounting bracket and the guide bracket shown in FIG. 9.
Figure 11:
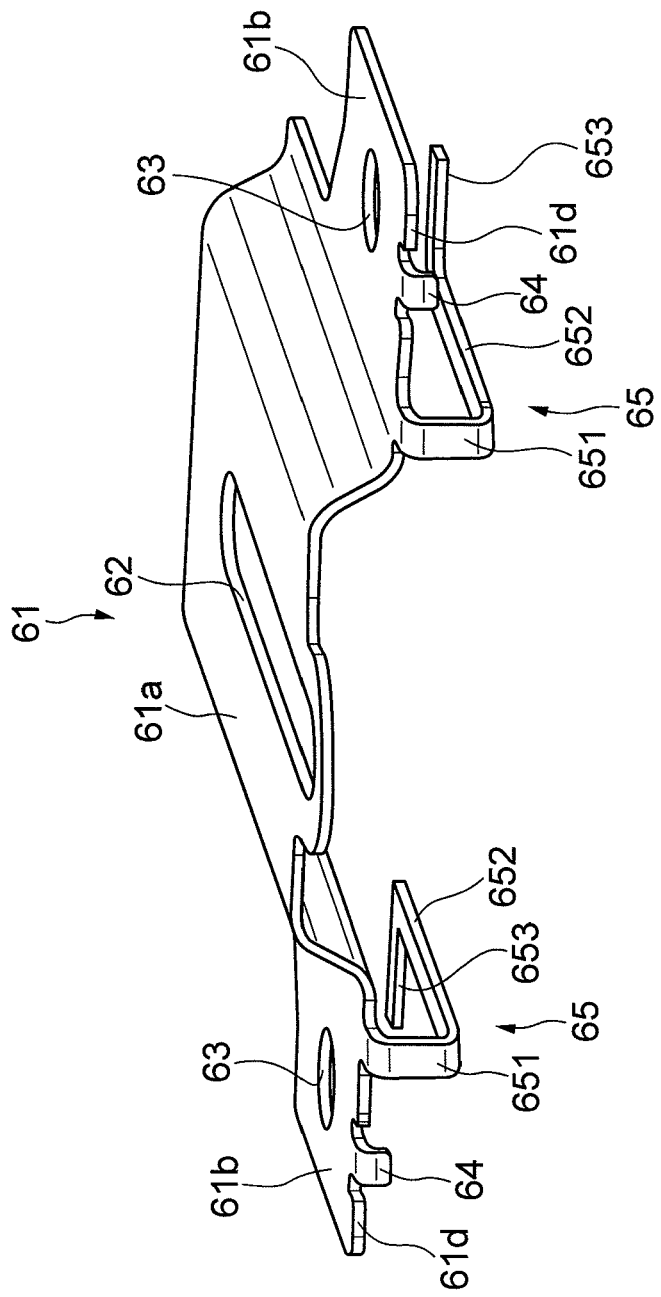
FIG. 11 is an enlarged perspective view of the single body of the guide bracket shown in FIG. 10.
Figure 12C:
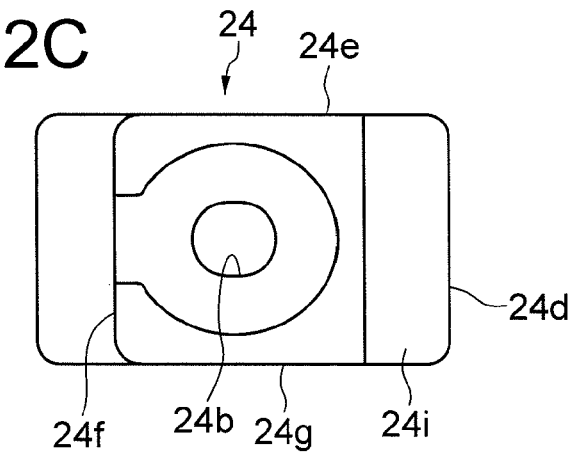
FIG. 12C is a bottom view of FIG. 12A.
Figure 13B:
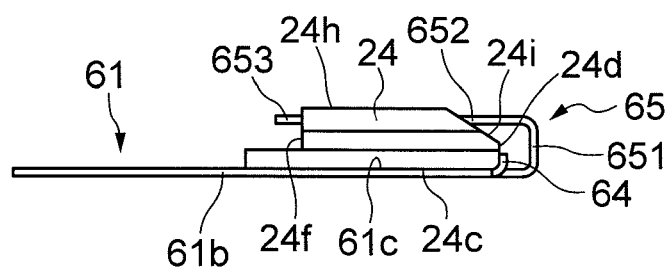
FIG. 13B is a side view of FIG. 13A seen along an arrow Q shown in FIG. 13A.
Figure 13C:
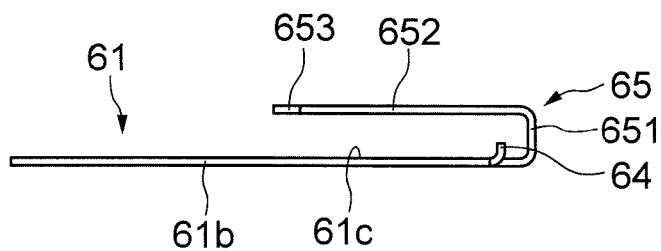
FIG. 13C is a side view of the guide bracket before engaging the capsule seen along the arrow Q.

FIG. 10 is an enlarged, exploded perspective view shown in the vicinity of the vehicle-mounting bracket and the guide bracket shown in FIG. 9. FIG. 11 is an enlarged perspective view of the single body of the guide bracket shown in FIG. 10. FIG. 12A is a front view showing a single body of a capsule according to the first embodiment of the present invention, FIG. 12B is a plan view of FIG. 12A, FIG. 12C is a bottom view of FIG. 12A, and FIG. 12D is a right side view of FIG. 12B. FIG. 13A is a bottom view showing an engaging state of the guide bracket and the capsules according to the first embodiment of the present invention, FIG. 13B is a side view of FIG. 13A seen along an arrow Q shown in FIG. 13A, and FIG. 13C is a side view of the guide bracket before engaging the capsule seen along the arrow Q.

As shown in FIGS. 2 through 13A-13C, the steering column assembly 105 is composed of an upper column 42, which is the outer column, and a lower column 46, which is the inner column disposed on the front side of the upper column 42. A steering shaft 43 on rearward end of which the steering wheel 101 shown in FIG. 1 is attached is rotatably supported on the rear side of the cylindrical upper column 42.

The upper column 42 is held by a vehicle-mounting bracket 21. The vehicle-mounting bracket 21 is composed of a center plate 21c, a couple of side plates 21b, 21b that are formed on both ends in the vehicle-body-width-direction of the lower surface of the center plate 21c integrally by means of, for example, welding or the like, and extend downward with facing each other in the vehicle-body-width-direction, and a couple of flange portions 21a, 21a that are formed on both ends in the vehicle-body-width-direction of the center plate 21c extending in parallel to the center axis of the upper column 42 and extending in the outer directions in the vehicle-body-width-direction. The upper column 42 is clamped by the couple of side plates 21b, 21b and held by the vehicle-mounting bracket 21. The vehicle-mounting bracket 21 is fixed to the vehicle body through capsules 24, 24 explained later. Tilt adjustment long holes 26, 26 are formed on the side plates 21b, 21b of the vehicle-mounting bracket 21. The upper column 42 can be tilt-adjusted with being guided by the tilt adjustment long holes 26, 26. The vehicle-mounting bracket 21 and the upper column 42 are made of an electrically conductive material such as a metal and the like.

A frontward portion of the upper column 42 is fitted on the lower column 46 movably in the axis direction with each other. In other words, it is fitted on the lower column 46 in a telescopic manner. A gear housing 47 of the electric assist mechanism 102 is attached to the frontward portion of the lower column 46. A frontward end of the gear housing 47 is rotatably held by the vehicle body 41 (see FIG. 5) about a tilt-center axis 45. With this construction, the lower column 46 is held by the vehicle body 41 through the gear housing 47 capable of performing the tilt adjustment.

Moreover, as shown in FIG. 5, a slit 421 is formed through the lower portion of the upper column 42 to the inner circumference of the upper column 42. Moreover, telescopic-adjustment long holes 422, 422 which are elongated in parallel to the center axis of the upper column 42 are formed on the lower portion of the upper column 42.

As shown in FIG. 5, a clamping bolt 51 is inserted in the vehicle-body-width-direction through the tilt adjustment long holes 26, 26 and the telescopic-adjustment long holes 422, 422. An operation lever 52 is attached to an end of the clamping bolt 51. The operation lever 52 is used to operate a movable cam 53 and a fixed cam 54, which constitute a cam lock mechanism. The movable cam 53 and the fixed cam 54 have cam surfaces facing each other. Each of the cam surfaces is formed with a protruding portion and a concavity portion, which are not shown.

With turning the operation lever 52 to one direction, the protruding portion of the movable cam 53 runs onto the protruding portion of the fixed cam 54, and the fixed cam 54 is pushed to the right side in the vehicle-body-width-direction, in other words, the right side in FIG. 5, and at the same time the clamping bolt 51 is pulled to the left in the vehicle-body-width-direction, in other words, to the left side in FIG. 5. Accordingly, the side plates 21b, 21b of the vehicle-mounting bracket 21 are tightened, and the side surfaces of the upper column 42 are tightened. In order to loose tightening of the side surfaces, the operation lever 52 is turned in the other direction. With this operation, the concavity portion of the movable cam 53 gets into the protruding portion of the fixed cam 54 to release the force pulling the fixed cam 54 to the right in the vehicle-body-width-direction, and at the same time the force pulling the clamping bolt 51 to the left in the vehicle-body-width-direction is released. Accordingly, the side plates 21b, 21b are separated. With tightening operation and releasing the tightening operation, the upper column 42 is clamped to/unclamped from the vehicle-mounting bracket 21, and tilt position of the upper column 42 is adjusted in unclamped state. Moreover, with the tightening operation and releasing the tightening operation, a diameter of an inner circumference of the upper column 42 is decreasing and released decreasing, so that the upper column 42 is clamped to/unclamped from the outer circumference of the lower column 46, and telescopic position of the upper column 42 is adjusted in unclamped state.

The output shaft 107 protruding forward from the gear housing 47 is connected to an unillustrated pinion engaging with an unillustrated rack shaft of the steering gear assembly 103 via an intermediate shaft 106 (see FIG. 1) to transmit rotational operation of the steering wheel 101 to the steering apparatus.

As shown in FIG. 5, the vehicle-mounting bracket 21 is fixed to the vehicle body 41. The dimension in the vehicle-body-width-direction of the flange portions 21a, 21a of the vehicle-mounting bracket 21 is such that the flange portions 21a, 21a protrude outside in the vehicle-body-width-direction of the side plates 21b, 21b. In other words, the flange portions 21a, 21a has a portion protruding to left side of the side plate 21b disposed to the left in the vehicle-body-width-direction in FIG. 5 and a portion protruding to right side of the side plate 21b disposed to the right in the vehicle-body-width-direction in FIG. 5. Cut-away portions 23, 23 opening rearward of the flange portions 21a, 21a are formed on these protruding portions left side and right side. Fixing mechanism of the vehicle-mounting bracket 21 to the vehicle body 41 is composed of a couple of cut-away portions 23, 23 formed on the flange portions 21a, 21a of the vehicle-mounting bracket 21 and capsules 24, 24 fitted to the right and left edges of the cut-away portions 23, 23. The cut-away portions 23, 23 have a construction symmetrical in the vehicle-body-width-direction with respect to the center axis of the upper column 42. Moreover, the capsules 24, 24 clamp the flange portions 21a, 21a in upper and lower direction.

Referring to FIGS. 5, 6, and 9, the capsules 24, 24 made of an electrically conductive material such as a metal or light alloy like aluminum or die-cast zinc alloy are fitted in the cut-away portions 23, 23. As shown in FIGS. 6 and 9, the capsules 24, 24 are each attached to the flange portion 21a by four shear pins 24a. In addition, as shown in FIGS. 5 and 6, the capsules 24, 24 are each fixed to the vehicle body 41 by a bolt 22 passing through a bolt hole 24b formed on the capsule 24.

A width in the vehicle-body-width-direction of each of the cut-away portions 23, 23 is formed gradually wider from forward to rearward, so that the vehicle-mounting bracket 21 becomes easy to detach from the capsules 24, 24 upon secondary collision.

As a driver hits the steering wheel 101 by an impact of a secondary collision to exert a strong impact force on it in the forward direction, the shear pins 24a shear, and the flange portions 21a, 21a of the vehicle-mounting bracket 21 are detached from the capsules 24, 24 and the vehicle-mounting bracket 21 makes a collapsing movement or moves forward. Then, the upper column 42 makes the collapsing movement forward with respect to the vehicle body along the lower column 46 to absorb the impact energy of the collision. In this instance, the capsules 24, 24 are remained to be fixed to the vehicle body. Here, "collapsing movement" is referred to such a movement that upon a secondary collision, the steering column and the bracket etc. will move forward while collapsing the energy absorption member(s).

As shown in FIGS. 5 and 6, a guide bracket 61 is attached to the upper side of the center plate 21c and the flange portions 21a, 21a of the vehicle-mounting bracket 21. The guide bracket 61 is formed by bending a metal plate. The guide bracket 61 is disposed a little upward of the center plate 21c and the flange portions 21a, 21a of the vehicle-mounting bracket 21, and a guide portion 61a formed on the center in the vehicle-body-width-direction extends rearward parallel to and along the lower column 46 to have a length reaching close to the rear end of the center plate 21c. A guide hole 62 for guiding a movement of the vehicle-mounting bracket 21 is formed on the center in the vehicle-body-width-direction of the guide portion 61a.

Flange portions 61b, 61b extending outside in the vehicle-body-width-direction from the guide portion 61a are formed on the rearward end of the guide portion 61a. As shown in FIGS. 5 and 8, flange portions 61b, 61b are disposed a little upward of the flange portions 21a, 21a of the vehicle-mounting bracket 21, and are formed a little narrower in the vehicle-body-width-direction than the width in the vehicle-body-width-direction of the flange portions 21a, 21a of the vehicle-mounting bracket 21. Bolt holes 63, 63 are formed on the flange portions 61b, 61b concentrically to the bolt holes 24b, 24b of the capsules 24, 24.

As shown in FIG. 5, bolts 22, 22 are inserted through bolt holes 24b, 24b formed on the capsules 24, 24 and bolt holes 63, 63 formed on the flange portions 61b, 61b to fix the vehicle-mounting bracket 21 and the guide bracket 61 to the vehicle body 41.

The guide hole 62 on the guide bracket 61 is formed parallel to the vertical plane including the center axis of the lower column 46, in other words, formed extending in forward and rearward direction. Moreover, as shown in FIGS. 5 and 7, a through hole 25 is formed on the center in the vehicle-body-width-direction of the center plate 21c of the vehicle-mounting bracket 21. A guide pin 71 is inserted through the through hole 25 and the guide hole 62 from the lower side, and a male screw 711 formed on the upper end of the guide pin 71 is screwed into a nut 72 to fasten the guide pin 71 to the center plate 21c.

As shown in an enlarged manner in FIG. 7, a head portion 712 with a disk shape having larger diameter than the male screw 711 is formed on the lower end of the male screw 711 on the guide pin 71. The guide pin 71 is made of a metal such as iron. With screwing the nut 72 onto the male screw 711 on the guide pin 71, the center plate 21c on the vehicle-mounting bracket 21 is clamped and fastened between the lower end of a cylindrical portion 721 of the nut 72 and the head portion 712. A gap β1 is formed between the upper surface of the guide portion 61a and a lower surface of a flange portion 722. Moreover, a gap β2 is formed between the lower surface of the guide portion 61a and the upper surface of the center plate 21c on the vehicle-mounting bracket 21.

These gaps β1 and β2 are provided for the following reasons that friction between the nut 72 and the guide portion 61a, and friction between the guide portion 61a and the center plate 21c on the vehicle-mounting bracket 21 are reduced so as to smoothly slide the center plate 21c with respect to the guide portion 61a with smoothly guiding the guide pin 71 by the guide hole 62 upon secondary collision. In other words, when these gaps β1 and β2 are not provided, in other words, when the upper surface of the guide portion 61a is made contact with the lower surface of the flange portion 722 on the nut 72, and the lower surface of the guide portion 61a is made contact with the upper surface of the center plate 21c on the vehicle-mounting bracket 21, friction force affected on these contact portions becomes large, so that it becomes difficult to slide the center plate 21c with respect to the guide portion 61a upon secondary collision. Accordingly, the guide pin 71 on the vehicle-mounting bracket 21 becomes difficult to be smoothly guided by the guide hole 62 on the guide bracket 61. As a result, the upper column 42 does not sufficiently make a collapse movement, so that impact energy of the secondary collision cannot be sufficiently absorbed.

Upon secondary collision, the guide bracket 61 is remained fixed to the vehicle body side together with the capsules 24, 24, the fitting between the guide pin 71 and the guide hole 62 holds the upper column 42 not to come down, and the guide pin 71 slides along the guide hole 62 to guide a collapse movement of the upper column 42.

Since the vehicle-mounting bracket 21 and the guide bracket 61 have such a construction, when the guide bracket 61 is fixed to the center plate 21c of the vehicle-mounting bracket 21 by the guide pin 71, the guide bracket 61 has a play in the upper and lower direction with respect to the vehicle-mounting bracket 21 by the gaps β1 and β2. Accordingly, before fixing the vehicle-mounting bracket 21 and the guide bracket 61 to the vehicle body by the bolt 22, the guide bracket 61 rotates with respect to the vehicle-mounting bracket 21 about the guide pin 71, so that a fixing position of the guide bracket 61 with respect to the vehicle-mounting bracket 21 becomes imprecise. The steering apparatus according to the present embodiment has a construction to prevent such a rotation of the guide bracket 61 about the guide pin 71. The construction to prevent the rotation is explained below.

As shown in FIGS. 10 through 13A-13C, first engaging portions 64, 64 and second engaging portions 65, 65 are formed on rear end surfaces 61d, 61d of the flange portions 61b, 61b of the guide bracket 61. The couple of left and right first engaging portions 64, 64 are projected downward from the rear end surfaces 61d, 61d, and engaged with rear end surfaces 24d, 24d of the capsules 24, 24.

The couple of left and right second engaging portions 65, 65 are formed more inner side in the vehicle-body-width-direction than the first engaging portions 64, 64, and are formed with downward projecting portions 651, 651 projecting downward from the rear end surfaces 61d, 61d. Frontward extending portions 652, 652 extending frontward are formed on the lower ends of the downward projecting portions 651, 651, and extend frontward along vehicle-body-width-direction-inner-side surfaces 24e, 24e of the capsules 24, 24. Minute gaps exist between the frontward extending portions 652, 652 and the vehicle-body-width-direction-inner-side surfaces 24e, 24e. The gap is provided for making it easy to assemble the guide bracket 61 to the vehicle-mounting bracket 21.

Vehicle-body-width-direction-extending portions 653, 653 bending at a right angle from the frontward extending portions 652, 652 and extending outside in the vehicle-body-width direction are formed on the front end of the frontward extending portions 652, 652. Accordingly, the second engaging portions 65, 65 are formed in "L" shape seen from lower side. The vehicle-body-width-direction-extending portions 653, 653 are engaged with front end surfaces 24f, 24f of the capsules 24, 24. As shown in FIG. 12A, an upper surface 24c of the capsule 24 protrudes more forward than the front end surface 24f, and a shoulder is formed by the frontward protruding portion and the front end surface 24f. As shown in FIGS. 13A and 13B, the vehicle-body-width-direction-extending portions 653, 653 of the second engaging portions 65, 65 are disposed to the shoulder. In this manner, the guide bracket 61 and the capsules 24, 24 are fixed in the upper and lower direction, in the front and rear direction, and in the vehicle-body-width direction by the couple of left and right first engaging portions 64, 64 and the second engaging portions 65, 65.

Accordingly, when the guide bracket 61 is fixed with respect to the vehicle-mounting bracket 21 by the guide pin 71, the upper surfaces 24c, 24c of the capsules 24, 24 are brought into contact with lower surfaces 61c, 61c (see FIGS. 5 and 6) on the flange portions 61b, 61b of the guide bracket 61, and the first engaging portions 64, 64 and the second engaging portions 65, 65 are engaged with the capsules 24, 24. Although the above-described minute gaps exist between the frontward extending portions 652, 652 and the vehicle-body-width-direction-inner-side surfaces 24e, 24e of the capsules 24, 24, when the guide bracket 61 rotates just the slightest amount, the vehicle-body-width-direction-inner-side surfaces 24e, 24e of the capsules 24, 24 are brought into contact and engaged with the frontward extending portions 652, 652, thereby obstructing rotation of the guide bracket 61.

As shown in 12A, in each capsule 24 in the first embodiment of the present invention, a chamfered portion 24i is formed between the rear end surface 24d and a lower surface 24h of the capsule 24. The chamfered portion 24i is formed for making it easy to assemble the guide bracket 61 to the vehicle-mounting bracket 21. The guide bracket 61 is assembled to the vehicle-mounting bracket 21, to which capsules 24, 24 have been attached, from the rear side. In this instance, the vehicle-body-width-direction-extending portions 653,653 of the second engaging portions 65, 65 are passed through the lower surfaces 24h, 24h sides from the rear end surfaces 24d, 24d sides of the capsules 24, 24, and engaged with the front end surfaces 24f, 24f. At the same time when the vehicle-body-width-direction-extending portions 653, 653 are engaged with the front end surfaces 24f, 24f, the frontward extending portions 652, 652 are disposed along the vehicle-body-width-direction-inner-side surfaces 24e, 24e of the capsules 24, 24. Upon assembling, when the vehicle-body-width-direction-extending portions 653, 653 are moved along the lower surfaces 24h, 24h sides from the rear end surfaces 24d, 24d sides of the capsules 24, 24, the chamfered portions 24i, 24i formed on the rear end surfaces 24d, 24d make the movement smooth. As a result, assembling work becomes effective. Moreover, upon moving the vehicle-body-width-direction-extending portions 653, 653 along the lower surfaces 24h, 24h sides, an amount of deformation of the engaging portions 65, 65 can be smaller, so that it becomes possible to prevent the engaging portions 65, 65 from a breakdown, and process yield can be improved. In this manner, since the second engaging portions 65, 65 are engaged with the vehicle-body-width-direction-inner-side surfaces 24e, 24e and the front end surfaces 24f, 24f of the capsules 24, 24, even if the chamfered portions 24i, 24i are formed on the capsule 24, the guide bracket 61 and the capsules 24, 24 can be fixed.

As a result, even before fixing the vehicle-mounting bracket 21 and the guide bracket 61 to the vehicle body 41 by the bolt 22, the guide bracket 61 does not rotate about the guide pin 71 with respect to the vehicle-mounting bracket 21, or move in the forward and rearward direction, or in the vehicle-body-width direction, so the fitting position of the guide bracket 61 with respect to the vehicle-mounting bracket 21 does not become imprecise. Accordingly, the work for fixing the vehicle-mounting bracket 21 and the guide bracket 61 to the vehicle body 41 by the bolt 22 can be performed smoothly. In other words, in the first embodiment, a couple of left and right first engaging portions 64, 64 and a couple of left and right second engaging portions 65, 65 constitute engaging portions for engaging with the capsules 24, 24, and a movement-preventing mechanism for preventing movement or rotation of the guide bracket 61 about the guide pin 71 with respect to the vehicle-mounting bracket 21 is constructed by the engaging portions and the capsules 24, 24.

(Second Embodiment)

Figure 14B:
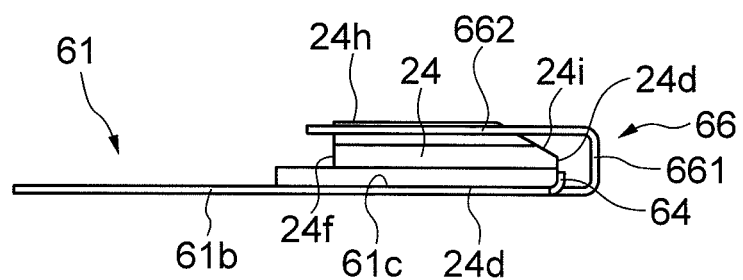
FIG. 14B is a side view seen along an arrow R shown in FIG. 14A.

Then, a second embodiment of the present invention is explained. FIG. 14A is a bottom view showing an engaging state of the guide bracket and the capsules according to the second embodiment of the present invention, and FIG. 14B is a side view seen along an arrow R shown in FIG. 14A. In the following explanation, only constructions different from the first embodiment are explained, and the duplicated explanations are omitted. In the explanation, the same reference number is attached to the same component. The second embodiment is a variation of the second engaging portions according to the first embodiment, and is an example that one of the couple of left and right capsules is fitted to the second engaging portion.

As shown in FIG. 14A, the first engaging portions 64, 64 are formed on the rear end surfaces 61d, 61d on the flange portions 61b, 61b of the guide bracket 61 as same as the first embodiment. The couple of left and right first engaging portion 64, 64 are projected downward from the rear end surfaces 61d, 61d, and engaged with the rear end surfaces 24d, 24d of the capsules 24, 24.

In the second embodiment, differing from the first embodiment, a second engaging portion 66 having a shape different from the first embodiment is formed on the rear end surface 61d of one flange portion 61b. In the present embodiment, the second engaging portion 66 is formed on the lower side in FIG. 14A, in other words, on the right side flange portion 61b with respect to the vehicle body. The second engaging portion 66 is formed in the vicinity of the first engaging portion 64 disposed lower side in FIG. 14A, and a downward projection portion 661 projecting downward from the rear end surface 61d is formed thereon. The width W1 in the vehicle-body-width-direction of the downward projecting portion 661 is formed larger than the width W2 in the vehicle-body-width-direction of the capsule 24. On the lower end of the downward projecting portion 661, frontward extending portions 662, 662 extending forward are formed on both ends in the vehicle-body-width direction of the downward projecting portion 661.

The frontward extending portion 662 at the inner side in the vehicle-body-width-direction extends forward along the inner side surface 24e at the inner side in the vehicle-body-width-direction of the capsule 24. The frontward extending portion 662 at the outer side in the vehicle-body-width direction extends forward along a vehicle-body-width-direction-outer surface 24g of the capsule 24. A minute gap exists between the frontward extending portion 662 at the inner side in the vehicle-body-width-direction and the inner side surface 24e in the vehicle-body-width-direction of the capsule 24. A minute gap exists between the frontward extending portion 662 at the outer side in the vehicle-body-width-direction and the width-direction-outer surface 24g of the capsule 24. These gaps are provided for making it easy to assemble the guide bracket 61 to the vehicle-mounting bracket 21.

A vehicle-body-width-direction extending portion 663 extending in the vehicle-body-width direction is formed on the front ends of the frontward extending portions 662, 662, and connects the front ends of the frontward extending portions 662, 662. The vehicle-body-width-direction extending portion 663 is engaged with the front end surface 24f of the capsule 24. Accordingly, the second engaging portion 66 is formed to be a rectangular frame seen from lower side, and encloses entire circumferences of the capsule 24 disposed lower side in FIG. 14A. As a result, the guide bracket 61 and the capsules 24, 24 are fixed in the upper and lower, the frontward and rearward, and the vehicle-body-width-directions by the couple of left and right first engaging portions 64, 64 and the one second engaging portion 66.

Accordingly, when the guide bracket 61 is fixed to the vehicle-mounting bracket 21 by the guide pin 71, the upper surfaces 24c, 24c of the capsules 24, 24 are brought into contact with the lower surfaces 61c, 61c of the flange portions 61b, 61b of the guide bracket 61 (see FIGS. 5 and 6), and the first engaging portions 64, 64 engage with the capsules 24, 24. At the same time, the second engaging portion 66 engages with the one capsule 24. Although minute gaps exist between the frontward extending portion 662 at the inner side in the vehicle-body-width-direction and the inner side surface 24e in the vehicle-body-width-direction of the capsule 24, and between the frontward extending portion 662 at the outer side in the vehicle-body-width-direction and the vehicle-body-width-direction-outer surface 24g of the capsule 24, when the guide bracket 61 rotates just the slightest amount, the vehicle-body-width-direction-inner-side surfaces 24e, 24e, or the vehicle-body-width-direction-outer surface 24g of the capsules 24, 24 are brought into contact and engage with the frontward extending portions 662, 662, thereby obstructing rotation of the guide bracket 61.

As a result, even before fixing the vehicle-mounting bracket 21 and the guide bracket 61 to the vehicle body 41 by the bolt 22, the guide bracket 61 does not rotate with respect to the vehicle-mounting bracket 21 about the guide pin 71, or move in the forward and rearward direction, or in the vehicle-body-width-direction, the fitting position of the guide bracket 61 with respect to the vehicle-mounting bracket 21 does not become imprecise. Accordingly, the work for fixing the vehicle-mounting bracket 21 and the guide bracket 61 to the vehicle body 41 by the bolt 22 can be performed smoothly. In other words, in the second embodiment, a couple of left and right first engaging portions 64, 64 and a one second engaging portion 65 constitute engaging portions for engaging with the capsules 24, 24, and a movement-preventing mechanism for preventing movement or rotation of the guide bracket 61 about the guide pin 71 with respect to the vehicle-mounting bracket 21 is constructed by the engaging portions and the capsules 24, 24.

(Third Embodiment)

Figure 15:
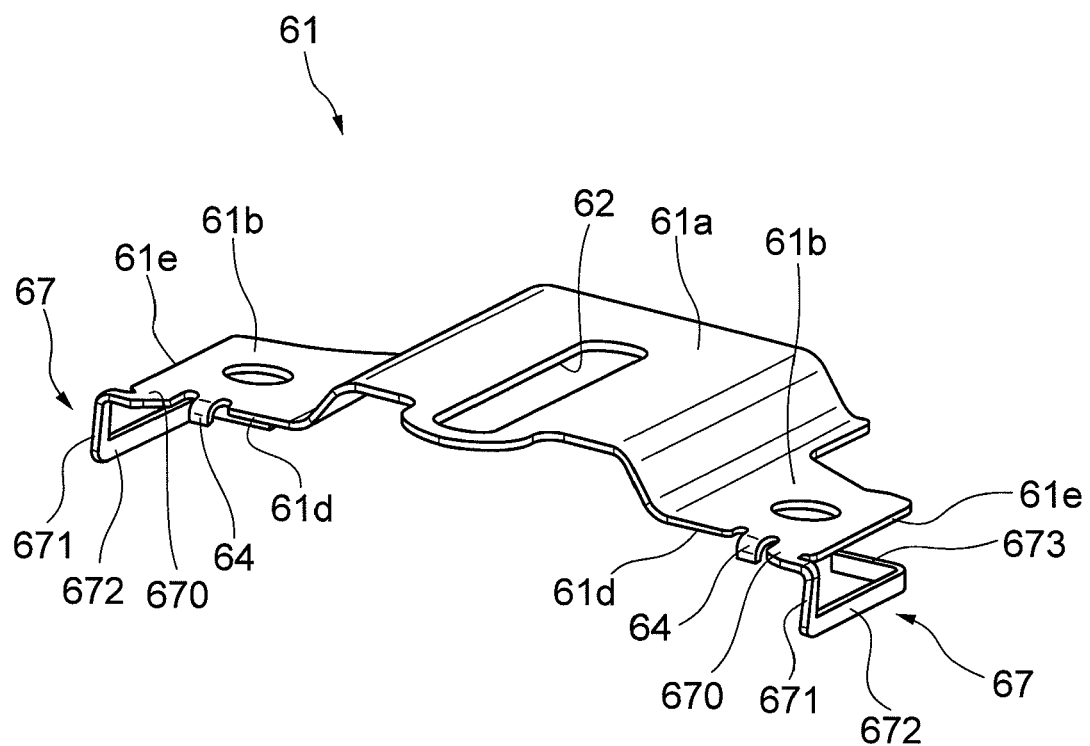
FIG. 15 is a perspective view of a guide bracket according to a third embodiment of the present invention.

Then, a third embodiment of the present invention is explained. FIG. 15 is a perspective view of a guide bracket according to a third embodiment of the present invention. In the following explanation, only constructions different from the first embodiment are explained, and the duplicated explanations are omitted. In the explanation, the same reference number is attached to the same component. The third embodiment is a variation of the second engaging portions according to the first embodiment.

As shown in FIG. 15, the first engaging portions 64, 64 are formed on the rear end surfaces 61d, 61d of the flange portions 61b, 61b of the guide bracket 61 as same as the first embodiment. The couple of left and right first engaging portion 64, 64 are projected downward from the rear end surfaces 61d, 61d, and engaged with the rear end surfaces 24d, 24d of the capsules 24, 24.

In the third embodiment, the couple of left and right second engaging portions 67, 67 are formed as same as the first embodiment.

Rearward protruding portions 670, 670 protruding rearward are formed on the side ends in the vehicle-body-width-direction of the rear end surfaces 61d, 61d of the flange portions 61b, 61b. Downward extending portions 671, 671 extending downward are formed on the rear side ends of the outside end in the vehicle-body-width-direction of the rearward protruding portions 670, 670, in other words, the rear side ends of vehicle-body-width-direction-outer-end surfaces 61e, 61e of the flange portions 61b, 61b. Frontward extending portions 672, 672 extending forward are formed on the lower ends of the downward extending portions 671, 671. The frontward extending portions 672, 672 are disposed with extending frontward along the vehicle-body-width-direction-outer surfaces 24g, 24g of the capsules 24, 24. Minute gaps exist between the frontward extending portions 672, 672 and the vehicle-body-width-direction-outer surfaces 24g, 24g of the capsules 24, 24. These gaps are provided for making it easy to assemble the guide bracket 61 to the vehicle-mounting bracket 21.

Vehicle-body-width-direction-extending portions 673, 673 bending at right angle from the frontward extending portions 672, 672 and extending inside in the vehicle-body-width-direction are formed on the front ends of the frontward extending portions 672, 672. Accordingly, the second engaging portions 67, 67 are formed an "L" shape, which is an opposite direction to the first embodiment, seen from down side. The vehicle-body-width-direction-extending portions 673, 673 are engaged with the front end surfaces 24f, 24f of the capsules 24, 24. As a result, the guide bracket 61 and the capsules 24, 24 are fixed in the upper and lower direction, the frontward and rearward direction, and the vehicle-body-width-direction by the couple of left and right first engaging portions 64, 64 and the second engaging portions 67, 67.

Accordingly, when the guide bracket 61 is fixed to the vehicle-mounting bracket 21 by the guide pin 71, the upper surfaces 24c, 24c of the capsules 24, 24 are brought into contact with the lower surfaces 61c, 61c of the flange portions 61b, 61b of the guide bracket 61 (see FIGS. 5 and 6), and the first engaging portions 64, 64 and the second engaging portions 67, 67 engage with the capsules 24, 24. Although minute gaps exist between the frontward extending portions 672, 672 and the vehicle-body-width-direction-outer surfaces 24g, 24g of the capsules 24, 24 as described above, when the guide bracket 61 rotates just the slightest amount, the vehicle-body-width-direction-outer surfaces 24g, 24g of the capsules 24, 24 are brought into contact and engage with the frontward extending portions 672, 672, thereby obstructing rotation of the guide bracket 61.

As a result, even before fixing the vehicle-mounting bracket 21 and the guide bracket 61 to the vehicle body 41 by the bolt 22, the guide bracket 61 does not rotate with respect to the vehicle-mounting bracket 21 about the guide pin 71, or move in the forward and rearward direction, or in the vehicle-body-width-direction, the fitting position of the guide bracket 61 with respect to the vehicle-mounting bracket 21 does not become imprecise. Accordingly, the work for fixing the vehicle-mounting bracket 21 and the guide bracket 61 to the vehicle body 41 by the bolt 22 can be performed smoothly. In other words, in the third embodiment, a couple of left and right first engaging portions 64, 64 and a couple of left and right second engaging portions 67, 67 constitute engaging portions for engaging with the capsules 24, 24, and a movement-preventing mechanism for preventing movement or rotation of the guide bracket 61 about the guide pin 71 with respect to the vehicle-mounting bracket 21 is constructed by the engaging portions and the capsules 24, 24.

Figure 16A:
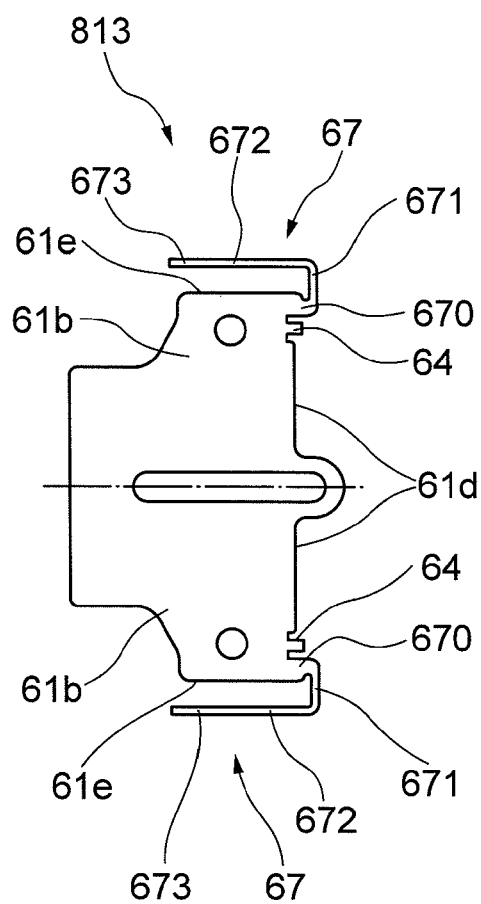
FIG. 16A is a plan view showing an unfolding shape of the guide bracket according to the third embodiment, and FIG. 16B a plan view showing an unfolding shape of the guide bracket according to the first embodiment by way of comparison with FIG. 16A.
Figure 16B:
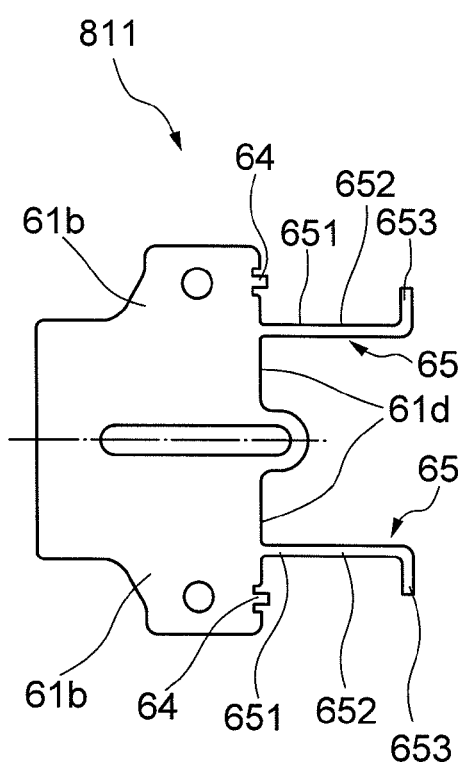

FIG. 16A is a plan view showing an unfolded shape of the guide bracket according to the third embodiment, and FIG. 16B a plan view showing an unfolded shape of the guide bracket according to the first embodiment by way of comparison with FIG. 16A. In FIGS. 16A and 16B, the left side of the drawing is the frontward, the right side of the drawing is the rearward. The upward and downward direction of the drawing is the width direction of the vehicle.

Each of the guide brackets according to the first through third embodiment is formed such that a guide bracket blank having a predetermined shape is punched out from a metal plate by a press working, and the guide bracket blank is bent to be completed. In other words, FIG. 16A has a shape of the guide bracket blank 813 according to the third embodiment. In the guide bracket blank 813, the rearward protruding portions 670, 670 protruding rearward are formed on the vehicle-body-width-direction end surfaces of the rear end surfaces 61d, 61d of the flange portions 61b, 61b. On the rearward ends of the vehicle-body-width-direction outside surfaces of the rearward protruding portions 670, 670, in other words, on the rearward ends of the vehicle-body-width-direction-outer-end surfaces 61e, 61e of the flange portions 61b, 61b, the extending portions 671, 671, which are to be disposed extending downward, are formed extending outside in the vehicle-body-width-direction. On the outside ends in the vehicle-body-width-direction of the extending portions 671, 671, the frontward extending portions 672, 672, which are to be disposed along the vehicle-body-width-direction-outer surfaces 24g, 24g of the capsules 24, 24, and the vehicle-body-width-direction-extending portions 673, 673, which are to be engaged with the front end surfaces 24f, 24f of the capsules 24, 24, are formed with continuously extending forward.

On the other hand, a guide bracket blank 811 according to the first embodiment has a shape shown in FIG. 16B. In other words, on the rear end surfaces 61d, 61d of the flange portions 61b, 61b, the projecting portions 651, 651, which are to be disposed projecting downward, and the extending portions 652, 652, which are to be disposed frontward along the vehicle-body-width-direction-inner-side surfaces 24e, 24e of the capsules 24, 24, are formed with continuously extending rearward. On the rearward ends of the frontward extending portions 652, 652, the vehicle-body-width-direction-extending portions 653, 653, which are to be engaged with the front end surfaces 24f, 24f of the capsules 24, 24, are formed extending outside in the vehicle-body-width direction.

As shown in FIGS. 16A and 163, the length in the front and rear direction of the guide bracket blank 813 according to the third embodiment is shorter than the length in the front and rear direction of the guide bracket blank 811 according to the first embodiment. In other words, the portions that are to be bent to become the second engaging portions 67, 67 or 65, 65, are formed extending rearward in the guide bracket blank 811. However, in the guide bracket 813, the portions are formed in the vicinity of the outside in the vehicle-body-width-direction of the flange portions 61b, 61b parallel to the vehicle-body-width-direction-outer-end surfaces 61e, 61e of the flange portions 61b, 61b. Accordingly, when the guide bracket blanks 813 and 811 are formed by a press working, a waste of materials is fewer in forming the guide bracket blank 813 than in forming the guide bracket blank 811. In other words, the third embodiment can increase in material efficiency on the manufacturing process of the guide bracket 61 and reduce manufacturing cost, in addition to having the same effect of the first embodiment.

Moreover, in the third embodiment, the following effects are further exhibited in addition to the similar effect as the first embodiment. At first, the engaging surfaces of the second engaging portions 67, 67 to the capsules 24, 24 are not press-cut-surfaces upon forming the guide bracket blank 813, but the surface of the plate, which is the material. In detail, the frontward extending portions 672, 672 engaging with the vehicle-body-width-direction-outer surfaces 24g, 24g of the capsules 24, 24, and the vehicle-body-width-direction-extending portions 673, 673 engaging with the front end surfaces 24f, 24f of the capsules 24, 24 are the surface of the plate. With this construction, it becomes possible to freely secure the area of the engaging surface without affecting the thickness of the plate, which is the material.

Furthermore, with changing the thickness of the plate, which is the material, elastic force of the second engaging portions 67, 67 can be controlled.

In the engaging surfaces of the second engaging portions 67, 67 to the capsules 24, 24, the width in the upper and lower direction is lager than the thickness of the plate, which is the material. In other words, in the frontward extending portions 672, 672 and the vehicle-body-width-direction-extending portions 673, 673, the surfaces having larger width engages with the capsules 24, 24. In the present embodiment, as shown in FIG. 15, the wider surfaces are disposed parallel to the upper and lower direction. Accordingly, the disposing space of the second engaging portions 67, 67 can be small.

(Fourth Embodiment)

Then, a fourth embodiment of the present invention is explained. In the following explanation, only constructions different from the first through third embodiments are explained, and the duplicated explanations are omitted. In the explanation, the same reference number is attached to the same component. In the fourth embodiment, a movement-preventing mechanism of the guide bracket is different from that of the first through the third embodiments. FIG. 17 is an enlarged, exploded perspective view shown in the vicinity of the vehicle-mounting bracket and the guide bracket of a steering apparatus according to a fourth embodiment. FIG. 18 is a vertical sectional view showing exploded state of the capsule and the guide bracket according to the fourth embodiment.

As shown in FIGS. 17 and 18, on the upper surfaces 24c, 24c of the capsules 24, 24, engaging protrusions 27, 27 having cylindrical shape protruding upward are formed. Moreover, on the flange portions 61b, 61b of the guide bracket 61, engaging holes 84, 84 having circular shape, in which the engaging protrusions 27, 27 are inserted, are formed. The height H1 in the upper and lower direction of the engaging protrusions 27, 27 is set to be larger than the sum of the gap β1 and the gap β2 (see FIG. 7) explained in the first embodiment. Incidentally, it is sufficient that the engaging protrusion 27 exists on one side among the couple of left and right capsules 24, 24. Moreover, the engaging protrusion 27 and the capsule 24 are integrally cast, so that manufacturing cost can be lowered.

Accordingly, when the guide bracket 61 is fixed to the vehicle-mounting bracket 21 by the guide pin 71, the upper surfaces 24c, 24c of the capsules 24, 24 are brought into contact with the lower surfaces 61c, 61c of the flange portions 61b, 61b of the guide bracket 61, the engaging protrusions 27, 27 of the capsules 24, 24 are inserted into the engaging holes 84, 84 on the guide bracket 61. As a result, even if the guide bracket 61 is moved in the upper and lower direction with respect to the vehicle-mounting bracket 21 by the amount of a backlash, the fitting state between the engaging protrusions 27, 27 and the engaging holes 84, 84 is secured. At the same time, rotation of the guide bracket 61 with respect to the vehicle-mounting bracket 21 about the guide pin 71 can be blocked.

Incidentally, in the present embodiment, with forming the engaging protrusions 27, 27 inside in the vehicle-body-width-direction than the position shown in FIG. 17, the distances in the vehicle-body-width-direction between the guide pin 71 and the engaging protrusions 27, 27 are preferably shortened. For example, the engaging protrusions 27, 27 are formed inside in the vehicle-body-width-direction of the bolt holes 24b, 24b of the capsules 24, 24. In this manner, when the distances in the vehicle-body-width-direction between the guide pin 71 and the engaging protrusions 27, 27 are shortened, even if the guide bracket 61 is moved in the upper and lower direction by the amount of gaps β1 and β2, variation in upper and lower direction of the engaging holes 84, 84 with respect to the engaging protrusions 27, 27 become small. Accordingly, even if the height H1 in the upper and lower direction of the engaging protrusions 27, 27 is made lower, the fitting state between the engaging protrusions 27, 27 and the engaging holes 84, 84 can be secured.

As a result, even before fixing the vehicle-mounting bracket 21 and the guide bracket 61 to the vehicle body 41 by the bolt 22, the guide bracket 61 does not rotate with respect to the vehicle-mounting bracket 21 about the guide pin 71, or move in the forward and rearward direction, or in the vehicle-body-width-direction, the fitting position of the guide bracket 61 with respect to the vehicle-mounting bracket 21 does not become imprecise. Accordingly, the work for fixing the vehicle-mounting bracket 21 and the guide bracket 61 to the vehicle body 41 by the bolt 22 can be performed smoothly. In other words, in the fourth embodiment, engaging holes 84, 84 on the guide bracket 61 constitute engaging portions engaging with the capsules 24, 24, and a movement-preventing mechanism for preventing movement or rotation of the guide bracket 61 about the guide pin 71 with respect to the vehicle-mounting bracket 21 is constructed by the engaging portions and the connecting protrusions 27, 27 on the capsules 24, 24.

(Fifth Embodiment)

Then, a fifth embodiment of the present invention is explained. FIG. 19 is a perspective view showing relevant portions of a steering apparatus according to a fifth embodiment seen from right upper side of the rear side of the vehicle body. FIG. 20 is an exploded perspective view exploding the capsule and the guide bracket according to the fifth embodiment. FIGS. 21A and 21B are vertical sectional views showing the capsule and the guide bracket according to the fifth embodiment, in which FIG. 21A is the vertical sectional view showing an assembled state, and FIG. 21B is the vertical sectional view showing an exploded state.

In the following explanation, only constructions different from the above-described embodiments are explained, and the duplicated explanations are omitted. In the explanation, the same reference number is attached to the same component. The fifth embodiment is a variation of the movement-preventing mechanism according to the fourth embodiment, in which an engaging protrusion protruding downward is formed on the bolt hole of the guide bracket, and the engaging protrusion is inserted into the bolt hole of the capsule.

As shown in FIGS. 19 through 21A and 21B, engaging protrusions 85, 85 that have hollow-cylindrical shapes and protrude downward lower than the lower surfaces 61c, 61c of the flange portions 61b, 61b are formed on the bolt holes 63, 63 of the flange portions 61b, 61b of the guide bracket 61. The engaging protrusions 85, 85 are formed by protruding the inner circumferences of the bolt holes 63, 63 downward upon forming the bolt holes 63, 63 on the flange portions 61b, 61b. In other words, the inner circumferences of the engaging protrusions 85, 85 constitute the bolt holes 63, 63. The height H2 in the upper and lower direction of the engaging protrusions 85, 85 is set to larger than the sum of the gaps β1 and β2 explained in the first embodiment. Incidentally, it is sufficient that the engaging protrusion 85 exists on one side among the couple of left and right bolt holes 63, 63.

Accordingly, when the guide bracket 61 is fixed to the vehicle-mounting bracket 21 by the guide pin 71, the upper surfaces 24c, 24c of the capsules 24, 24 are brought into contact with the lower surfaces 61c, 61c of the flange portions 61b, 61b on the guide bracket 61, the engaging protrusions 85, 85 of the flange portions 61b, 61b are inserted into the bolt holes 24b, 24b on the capsules 24, 24. As a result, even if the guide bracket 61 is moved in the upper and lower direction with respect to the vehicle-mounting bracket 21 by the amount of a backlash of the gaps β1 and β2, the fitting state between the engaging protrusions 85, 85 and the bolt holes 24b, 24b is secured. Since the engaging protrusions 85, 85 are inserted into the bolt holes 24b, 24b on the capsules 24, 24, engaging holes for inserting the engaging protrusions 85, 85 are not necessary to be formed on the capsules 24, 24, so that manufacturing cost of the capsules 24, 24 can be lowered.

As a result, even before fixing the vehicle-mounting bracket 21 and the guide bracket 61 to the vehicle body 41 by the bolt 22, the guide bracket 61 does not rotate with respect to the vehicle-mounting bracket 21 about the guide pin 71, or move in the forward and rearward direction, the fitting position of the guide bracket 61 with respect to the vehicle-mounting bracket 21 does not become imprecise. In other words, in the fifth embodiment, the engaging protrusions 85, 85 of the flange portions 61b, 61b constitutes engaging portions engaging with the capsules 24, 24, and a movement-preventing mechanism for preventing movement or rotation of the guide bracket 61 about the guide pin 71 with respect to the vehicle-mounting bracket 21 is constructed by the engaging portions and the bolt holes 24b, 24b on the capsules 24, 24.

(Sixth Embodiment)

Figure 22:
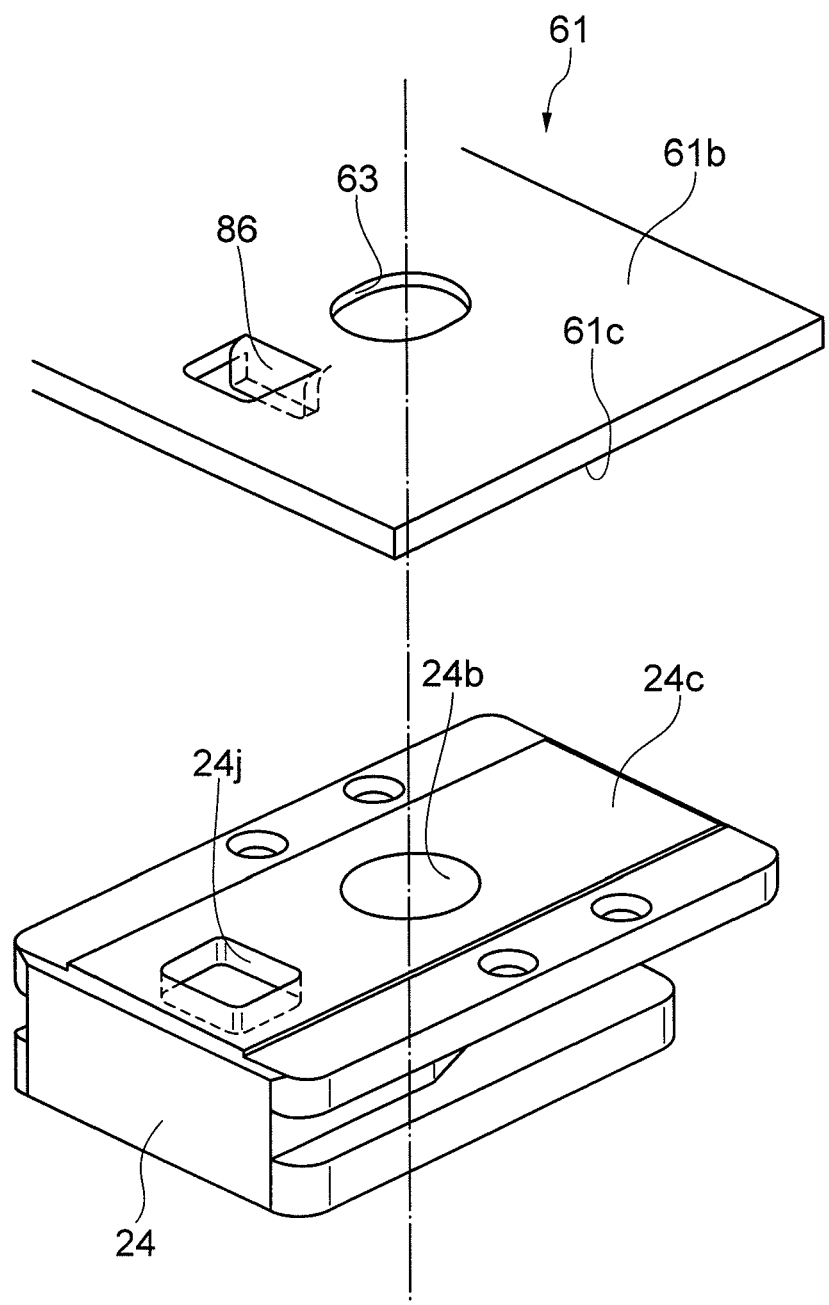
FIG. 22 is an exploded perspective view exploding a capsule and a guide bracket according to a sixth embodiment.

Then, a sixth embodiment of the present invention is explained. FIG. 22 is an exploded perspective view exploding a capsule and a guide bracket according to a sixth embodiment. In the following explanation, only constructions different from the above-described embodiments are explained, and the duplicated explanations are omitted. In the explanation, the same reference number is attached to the same component. The sixth embodiment is a variation of the movement-preventing mechanism according to the fourth embodiment, in which an engaging protrusion protruding downward is formed on the guide bracket, and the engaging protrusion is inserted into the engaging hole formed on the capsule.

As shown in FIG. 22, engaging protrusions 86, 86 having rectangular plate shapes are formed on the rear side of the bolt holes 63, 63 of the flange portions 61b, 61b of the guide bracket 61. The engaging protrusions 86, 86 are formed by cutting the flange portions 61b, 61b in rectangular shapes and protruding the rectangular shape portions downward. Moreover, engaging holes 24j, 24j having rectangular shapes, in which the engaging protrusions 86, 86 are inserted, are formed on the upper surfaces 24c, 24c of the capsules 24, 24. The height in the upper and lower direction of the engaging protrusions 86, 86 is not illustrated, but set larger than the sum of the gaps β1 and β2 explained in the first embodiment. Incidentally, it is sufficient that the engaging protrusion 86 exists on one side among the couple of left and right flange portions 61b, 61b.

Accordingly, when the guide bracket 61 is fixed to the vehicle-mounting bracket 21 by the guide pin 71, the upper surfaces 24c, 24c of the capsules 24, 24 are brought into contact with the lower surfaces 61c, 61c of the flange portions 61b, 61b of the guide bracket 61, the engaging protrusions 86, 86 of the flange portions 61b, 61b are inserted into the engaging holes 24j, 24j on the capsules 24, 24. As a result, even if the guide bracket 61 is moved in the upper and lower direction with respect to the vehicle-mounting bracket 21 by the amount of a backlash of the gaps β1 and β2, the fitting state between the engaging protrusions 86, 86 and the engaging holes 24j, 24j is secured.

As a result, even before fixing the vehicle-mounting bracket 21 and the guide bracket 61 to the vehicle body 41 by the bolt 22, the guide bracket 61 does not rotate with respect to the vehicle-mounting bracket 21 about the guide pin 71, or move in the forward and rearward direction, the fitting position of the guide bracket 61 with respect to the vehicle-mounting bracket 21 does not become imprecise. In other words, in the sixth embodiment, the engaging protrusions 86, 86 of the flange portions 61b, 61b constitutes engaging portions engaging with the capsules 24, 24, and a movement-preventing mechanism for preventing movement or rotation of the guide bracket 61 about the guide pin 71 with respect to the vehicle-mounting bracket 21 is constructed by the engaging portions and the engaging holes 24j, 24j on the capsules 24, 24.

(Seventh Embodiment)

Figure 23:
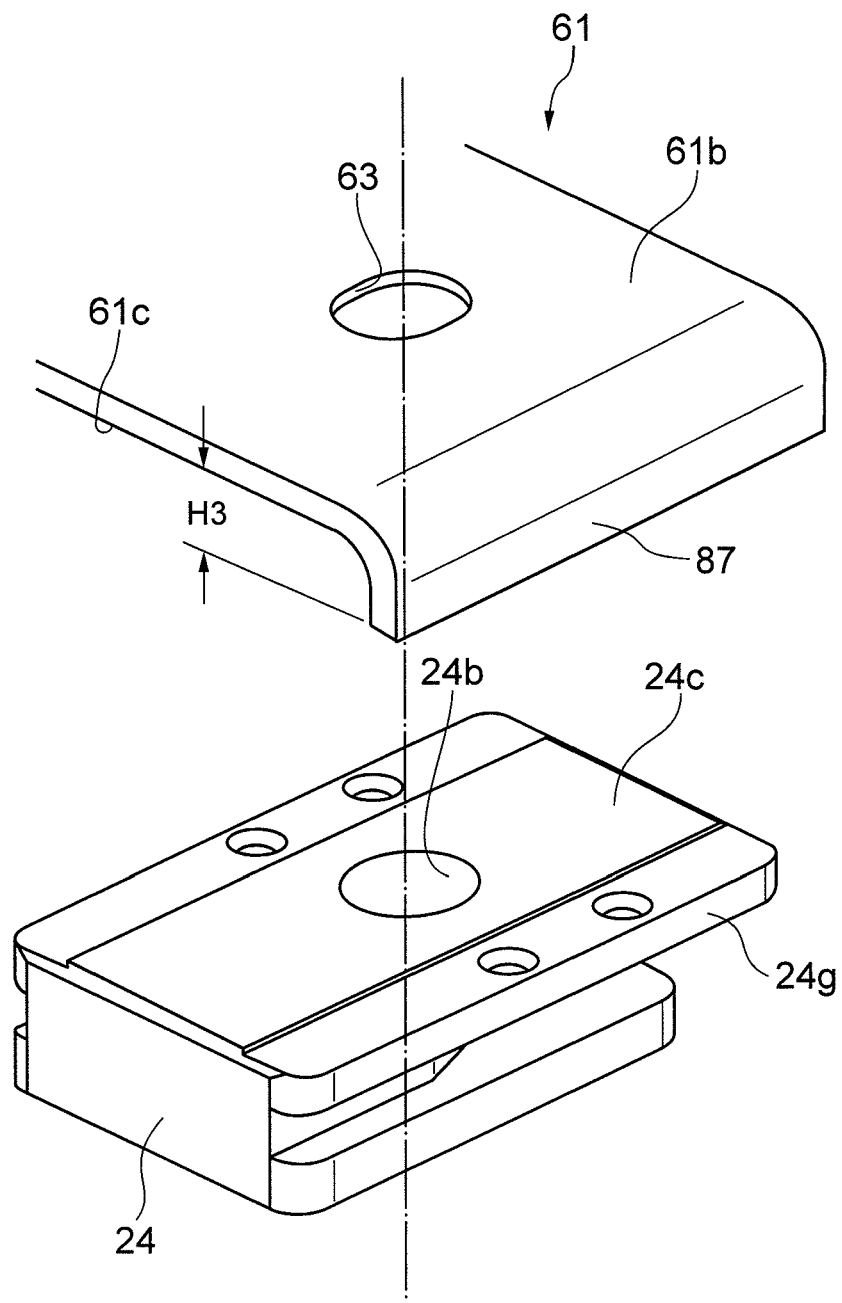
FIG. 23 is an exploded perspective view exploding a capsule and a guide bracket according to a seventh embodiment.

Then, a seventh embodiment of the present invention is explained. FIG. 23 is an exploded perspective view exploding a capsule and a guide bracket according to a seventh embodiment of the present invention. In the following explanation, only constructions different from the above-described embodiments are explained, and the duplicated explanations are omitted. In the explanation, the same reference number is attached to the same component. The seventh embodiment is a variation of the movement-preventing mechanism according to the fourth embodiment, in which portions at the ends in the vehicle-body-width-direction of the guide bracket are bent downward, and the bent portions are engaged with outside surfaces formed on the end portions in the vehicle-body-width-direction of the capsules.

As shown in FIG. 23, bent portions 87, 87 are formed on the flange portions 61b, 61b of the guide bracket 61. The bent portions 87, 87 are formed by bending the end portions in the vehicle-body-width-direction of the flange portions 61b, 61b downward. The vehicle-body-width-direction-outer surfaces 24g, 24g for engaging with the bent portions 87, 87 are formed on the end portions in the vehicle-body-width-direction of the capsules 24, 24. The height H3 in the upper and lower direction of the bent portions 87, 87 is set larger than the sum of the gaps β1 and β2 explained in the first embodiment. Incidentally, it is sufficient that the bent portion 87 exists on one side among the couple of left and right flange portions 61b, 61b.

Accordingly, when the guide bracket 61 is fixed to the vehicle-mounting bracket 21 by the guide pin 71, the upper surfaces 24c, 24c of the capsules 24, 24 are brought into contact with the lower surfaces 61c, 61c of the flange portions 61b, 61b of the guide bracket 61, the bent portions 87, 87 of the flange portions 61b, 61b are engaged with the vehicle-body-width-direction-outer surfaces 24g, 24g of the capsules 24, 24. As a result, even if the guide bracket 61 is moved in the upper and lower direction with respect to the vehicle-mounting bracket 21 by the amount of a backlash of the gaps β1 and β2, the fitting state between the bent portions 87, 87 and the vehicle-body-width-direction-outer surfaces 24g, 24g is secured.

As a result, even before fixing the vehicle-mounting bracket 21 and the guide bracket 61 to the vehicle body 41 by the bolt 22, the guide bracket 61 does not rotate with respect to the vehicle-mounting bracket 21 about the guide pin 71, so that the fitting position of the guide bracket 61 with respect to the vehicle-mounting bracket 21 does not become imprecise. In other words, in the seventh embodiment, the bent portions 87, 87 of the flange portions 61b, 61b constitute engaging portions engaging with the capsules 24, 24, and a movement-preventing mechanism for preventing movement or rotation of the guide bracket 61 about the guide pin 71 with respect to the vehicle-mounting bracket 21 is constructed by the engaging portions and the vehicle-body-width-direction-outer surfaces 24g, 24g of the capsules 24, 24.

Incidentally, in each embodiment of the present invention, there have been described cases in which the present invention is applied to a tilt-telescopic type steering apparatus in which the tilt position and the telescopic position of the steering column are both adjusted, the present invention may be applied to a tilt type steering apparatus, a telescopic type steering apparatus, and a steering apparatus that allows adjustment of neither the tilt position nor telescopic position.

What is claimed is:

1. In a steering apparatus comprising:
   a steering shaft capable of attaching a steering wheel at rearward end thereof with respect to a vehicle body;
   a steering column that rotatably holds the steering shaft inside thereof and moves frontward with respect to the vehicle body upon a secondary collision;
   a vehicle-mounting bracket that holds the steering column and moves frontward with respect to the vehicle body together with the steering column while collapsing upon the secondary collision;
   a couple of capsules that are disposed in a width direction with respect to the vehicle body, fixed to the vehicle body, and on which the vehicle-mounting bracket is attached so as to hold the vehicle-mounting bracket to the vehicle body, and make the vehicle-mounting bracket detach from the vehicle body while absorbing predetermined impact energy upon the secondary collision;
   a fixed bracket that is attached to the vehicle-mounting bracket to be fixed to the vehicle body and remained to the vehicle body upon the secondary collision; and
   a guide mechanism that guides the movement of the vehicle-mounting bracket upon the secondary collision;
   the improvement comprising:
   a movement-preventing mechanism that is provided for preventing movement of the fixed bracket attached to the vehicle-mounting bracket, with respect to the vehicle-mounting bracket before fixing the fixed bracket to the vehicle body,
   wherein the movement-preventing mechanism includes at least one of the couple of capsules, and an engaging portion that is formed on the fixed bracket and engaged with said at least one of the couple of capsules, and
   wherein said engaging portion includes:
   a couple of first engaging portions each of which protrudes downward from in the vicinity of each of end in the width direction with respect to the vehicle body of the rearward end surface of the fixed bracket, and engaged with the rear end surface of the corresponding capsule; and
   a couple of second engaging portions each of which protrudes downward from rearward end of each end surface in the width direction of the fixed bracket, and includes a side-surface-width engaging portion engaging with a vehicle-body-width-direction-side of the corresponding capsule and a front-end-surface-engaging portion engaging with a front-end-surface of the same capsule.

2. The steering apparatus according to claim 1, wherein the guide mechanism is composed of a guide pin fixed to the vehicle-mounting bracket, and a guide hole that is formed on the fixed bracket and engaged with the guide pin slidably in the moving direction of the vehicle-mounting bracket, the fixed bracket is attached to the vehicle-mounting bracket by engaging the guide pin slidably to the guide hole, and said engaging portion, engaging with said at least one of the capsules, prevents the fixed bracket from moving in the frontward and rearward direction and in the width direction with respect to the vehicle body, and rotating around the guide pin.

3. The steering apparatus according to claim 2, wherein a chamfered portion is formed between a rear end surface and a lower surface of each capsule.

4. The steering apparatus according to claim 2, wherein said fixed bracket is formed from a single plate, the couple of second engaging portions comprising downward extending portions extending downward from rearward ends of end surfaces at both sides of the single plate in the width direction with respect to the vehicle body, the side-surface-engaging portions extending forward along vehicle-body-width-direction-side surfaces of the corresponding capsule from the lower ends of the downward extending portions, and front-end-surface-engaging portions bending at a right angle from frontward ends of the side-surface-engaging portions and extending inside in the vehicle-body-width direction.

5. The steering apparatus according to claim 2, wherein a chamfered portion is formed between a rear end surface and a lower surface of each capsule.

6. The steering apparatus according to claim 1, wherein said fixed bracket is formed from a single plate, the couple of second engaging portions comprising downward extending portions extending downward from rearward ends of end surface at both sides of the single plate in the width direction with respect to the vehicle body, the corresponding capsule from the lower ends of the downward extending portions, and a front-end-surface-engaging portions bending at a right angle from frontward ends of the side-surface-engaging portions and extending inside in the vehicle-body-width direction.

7. The steering apparatus according to claim 1, wherein a chamfered portion is formed between a rear end surface and a lower surface of each capsule.

8. In a steering apparatus comprising:
a steering shaft capable of attaching steering wheel at rearward end thereof with respect to a vehicle body;
a steering column that rotatbly holds the steering shaft inside thereof and moves frontward with respect to the vehicle body upon a secondary collision;
a vehicle-mounting bracket that holds the steering column and moves frontward with respect to th vehicle body together with the steering column while collapsing upon the secondary collision;
a couple capsules that are disposed in a width direction with respect to the vehicle body, fixed to the vehicle body, and on which the vehicle-mounting bracket is attached so as to hold the vehicle-mounting bracket to the vehicle body, and make vehicle-mounting bracket detach from the vehicle body while absorbing predetermined impact energy upon the secondary collision;
a fixed bracket that is attached to the vehicle-mounting bracket to be fixed to the vehicle body and remained to the vehicle body upon the secondary collision; and
a guide mechanism that guides the movement of the vehicle-mounting bracket upon the secondary collision;
the improvement comprising:
a movement-preventing mechanism that is provided for preventing movement of the fixed bracket attached to the vehicle-mounting bracket, with respect to the vehicle-mounting bracket before fixing the fixed bracket to the vehicle body, wherein the movement-preventing mechanism includes at least one of the couple of capsules, and an engaging portion that is formed on the fixed bracket and engaged with said at least one of the couple of capsules, and wherein said engaging portion includes:
a couple of first engaging portions each of which protrudes downward from in the vicinity of each end in the width direction with respect to the vehicle body of the rearward end surface of the fixed bracket, and engaged with the rear end surface of the corresponding capsule; and
a couple of second engaging portions each of which protrudes downward from inside in the width direction of the first engaging portion of the rearward end surface of the fixed bracket, and includes a side-surface-engaging portion engaging with a vehicle-body-width-direction-side surface of the corresponding capsule and a front-end-surface-engaging portion engaging with a front-end-surface of the same capsule.

9. The steering apparatus according to claim 8, wherein a chamfered portion is formed between a rear end surface and a lower surface of each capsule.

10. The steering apparatus according to claim 8, wherein the guide mechanism is composed of a guide pin fixed to the vehicle-mounting bracket, and a guide hole that is formed on the fixed bracket and engaged with the guide pin slidably in the moving direction of the vehicle-mounting bracket, the fixed bracket is attached to the vehicle-mounting bracket by engaging the guide pin slidably to the guide hole, and said engaging portion, engaging with said at least one of the capsules, prevents the fixed bracket from moving in the frontward and rearward direction and in the width direction with respect to the vehicle body, and rotating around the guide pin.

11. In a steering apparatus comprising;
a steering shaft capable of attaching a steering wheel at rearward end thereof with respect to a vehicle body;
a steering column that rotably holds the steering shaft inside thereof and moves frontward with respect to the vehicle body upon a secondary collision;
a vehicle-mounting bracket that holds the steering column and moves frontward with respect to the vehicle body together with the steering column while collapsing upon the secondary collision;
a couple of capsules that are disposed in a width direction with respect to the vehicle body, fixed to the vehicle body, and on which the vehicle-mounting bracket is attached so as to hold the vehicle-mounting bracket to the vehicle body, and make the vehicle-mounting bracket detach from the vehicle body while absorbing predetermined impact energy upon the secondary collision;
a fixed bracket that is attached to the vehicle-mounting bracket to be fixed to the vehicle body and remained to the vehicle body upon the secondary collision; and
a guide mechanism that guides the movement of the vehicle-mounting bracket upon the secondary collision;
the improvement comprising:
a movement-preventing mechanism that is provided for preventing movement of the fixed bracket attached to the vehicle-mounting bracket, with respect to the vehicle-mounting bracket before fixing the fixed bracket to the vehicle body, wherein the movement-preventing mechanism includes at least one of the couple of capsules, and an engaging portion that is formed on the fixed bracket and engaged with said at least one of the couple of capsules, and wherein said engaging portion includes:

a couple of first engaging portions each of which protrudes downward from in the vicinity of each end in the width direction with respect to the vehicle body of the rearward end surface of the fixed bracket, and engaged with the rear end surface of the corresponding capsule; and a single second engaging portions which protrudes downward from in the vicinity of one of the couple of first engaging portions of the rearward end surface of the fixed bracket, and includes a side-surface-connecting portion engaging with a vehicle-body-width-direction-side surface of the corresponding capsule and a front-end-surface-engaging portion engaging with a front-end-surface of the same capsule.

12. The steering apparatus according to claim 11, wherein a chamfered portion is formed between a rear end surface and a lower surface of each capsule.

13. The steering apparatus according to claim 11, wherein the guide mechanism is composed of a guide pin fixed to the vehicle-mounting bracket, and a guide hole that is formed on the fixed bracket and engaged with the guide pin slidably in the moving direction of the vehicle-mounting bracket, the fixed bracket is attached to the vehicle-mounting bracket by engaging the guide pin slidably to the guide hole, and said engaging portion, engaging with said at least one of the capsules, prevents the fixed bracket from moving in the frontward and rearward direction and in the width direction with respect to the vehicle body, and rotating around the guide pin.

14. In a steering apparatus comprising:

a steering wheel shaft capable of attaching a steering wheel at rearward end thereof with respect to a vehicle body;

a steering column that rotatably holds the steering shaft inside thereof and moves frontward with respect to the vehicle body upon a secondary collision;

a vehicle-mounting bracket that holds the steering column and moves frontward with respect to the vehicle body together with the steering column while collapsing upon the secondary collision;

a couple of capsules that are disposed in a width direction with respect to the vehicle body, fixed to the vehicle body, and on which the vehicle-mounting bracket is attached so as to hold the vehicle-mounting bracket to the vehicle body, and make the vehicle-mounting bracket detach from the vehicle body while absorbing predetermined impact energy upon the secondary collision;

a fixed bracket that is attached to the vehicle-mounting bracket to be fixed to the vehicle body and remained to the vehicle body upon the secondary collision; and a guide mechanism that guides the movement of the vehicle-mounting bracket upon the secondary collision;

the improvement comprising a movement-preventing mechanism that is provided for preventing movement the fixed bracket attached to the vehicle-mounting bracket, with respect to the vehicle-mounting bracket before fixing the fixed bracket to the vehicle body, wherein the movement-preventing mechanism includes at least one of the couple of capsules, and an engaging portion that is formed on the fixed bracket and engaged with said at least one of the couple of capsules, the guide mechanism is composed of a guide pin fixed to the vehicle-mounting bracket and a hole that is formed on the fixed bracket and engaged with engaged with the guide pin slidably in the moving direction of the vehicle-mounting bracket, the fixed bracket is attached to the vehicle-mounting bracket by engaging the guide pin slidably to the guide hole, said engaging portion, engaging with said at least one of the capsules, prevents the fixed bracket from moving in the frontward and rearward direction and in the width direction with respect to the vehicle body, and rotating around the guide pin, said engaging portion is a protruding portion formed on at least one lower surface among lower surfaces in the vicinity of both side ends in the width direction with respect to the vehicle body of the fixed bracket protruding downward lower than the lower surface, and a hole for engaging with the protruding portion protruding downward is formed on the capsule.

15. The steering apparatus according to claim 14, wherein said protruding portion protruding downward is formed a cylindrical shape, an inner circumference of the cylindrical shape forms a bolt hole in which a bolt for attaching the fixed bracket to the vehicle body is inserted, and the hole on the capsule is a bolt hole in which a bolt for attaching the capsule to the vehicle body is inserted.

* * * * *